United States Patent [19]

Atkinson et al.

[11] Patent Number: 5,715,441
[45] Date of Patent: Feb. 3, 1998

[54] METHOD AND SYSTEM FOR STORING AND ACCESSING DATA IN A COMPOUND DOCUMENT USING OBJECT LINKING

[75] Inventors: Robert G. Atkinson, Woodinville; Andrew L. Bliss; Philip J. Lafornara, both of Bellevue; Philip Ljubicich; Alexander G. Tilles, both of Seattle; Antony S. Williams, Redmond, all of Wash.

[73] Assignee: Microsoft Corporation, Redmond, Wash.

[21] Appl. No.: 474,100

[22] Filed: Jun. 7, 1995

Related U.S. Application Data

[62] Division of Ser. No. 909,533, Jul. 6, 1992, Pat. No. 5,506,983.

[51] Int. Cl.⁶ .................................................. G06F 17/30
[52] U.S. Cl. .................... 395/601; 395/703; 395/133; 395/777; 395/761
[58] Field of Search ........................ 395/600, 703, 395/148, 161, 612, 621, 335, 601, 614, 611, 777, 602, 761; 364/419, 523, 300, 148; 370/469

[56] References Cited

U.S. PATENT DOCUMENTS

| | | | |
|---|---|---|---|
| 4,536,837 | 8/1985 | Olson et al. | 364/621 |
| 4,723,209 | 2/1988 | Hernandez et al. | 395/783 |
| 4,739,477 | 4/1988 | Barker et al. | 395/611 |
| 4,899,299 | 2/1990 | MacPhail | 364/570 |
| 4,907,151 | 3/1990 | Bartlett | 364/493 |
| 4,933,880 | 6/1990 | Borgendale et al. | 395/777 |
| 5,029,125 | 7/1991 | Sciupac | 395/621 |
| 5,093,779 | 3/1992 | Sakurai | 395/601 |
| 5,146,553 | 9/1992 | Noguchi et al. | 395/778 |
| 5,173,853 | 12/1992 | Kelly et al. | 395/792 |

(List continued on next page.)

OTHER PUBLICATIONS

Heller, Martin "Future Documents", BYTE, May 1991, pp. 127–135.

Bennett, John K. "Experience with Distributed Smalltalk", Software Practice and Experience, v.20(2), pp. 157–180, Feb. 1990.

Levy et al. "Modules, Objects and Distributed Programming: Issues in RPC and Remote Object Invocation", Software Practice and Experience, v. 21(1), pp. 77–90, Jan. 1991.

"Microsoft Unveils Object Linking, Embedding Spec.", Computergram International, Dec. 12, 1990, n1574.

Bergman, Noel J. "Our Object–Oriented Future", Computer Language, Nov. 1990, v7, No. 11, p. 115(4).

Millikin, M. "OLE for Compound Documents", Patricia Seybold's Office Computing Report, Feb. 1991, v14, n2, p. 15(3).

Cline, Craig "Microsoft Confirms Stem Strategy: Windows Forever! A New Start for OS/2!", The Seybold Report on Desktop Publishing, Mar. 4, 1991, v5, n7, p. 25(9).

Sherer, Paul "Built–in Networking in the Works for Windows", PC Week, Aug. 12, 1991, v8, n32, p. S33(2).

(List continued on next page.)

Primary Examiner—Thomas G. Black
Assistant Examiner—Charles Rones
Attorney, Agent, or Firm—Seed and Berry LLP

[57] ABSTRACT

A method and system for interfacing an application program with a compound document storage system. The present invention provides an interface which an application program uses to manipulate compound documents. In a preferred embodiment, this interface is implemented in a multilayered architecture. The first layer provides methods which an application program uses to access a compound document using the functions of the second layer. The second layer maps requests to store data in the compound document to a storage format using the functions of the third layer. The third layer maps requests to write to a file to an arbitrary storage medium.

28 Claims, 14 Drawing Sheets

U.S. PATENT DOCUMENTS

| | | | |
|---|---|---|---|
| 5,185,885 | 2/1993 | Dysart et al. | 395/611 |
| 5,226,145 | 7/1993 | Moronaga et al. | 395/412 |
| 5,243,518 | 9/1993 | Holt et al. | 395/761 |
| 5,247,520 | 9/1993 | Geise et al. | 370/469 |
| 5,269,019 | 12/1993 | Peterson et al. | 395/621 |
| 5,280,609 | 1/1994 | MacPhail | 395/601 |
| 5,317,730 | 5/1994 | Moore et al. | 395/611 |
| 5,335,290 | 8/1994 | Cullen et al. | 382/176 |
| 5,339,392 | 8/1994 | Risberg et al. | 395/333 |
| 5,349,658 | 9/1994 | O'Rourke et al. | 395/349 |
| 5,359,708 | 10/1994 | Bloomer et al. | 395/786 |
| 5,371,885 | 12/1994 | Letwin | 395/601 |
| 5,423,034 | 6/1995 | Cohen-Levy et al. | 395/610 |
| 5,437,027 | 7/1995 | Bannon et al. | 395/614 |
| 5,448,727 | 9/1995 | Annevelink | 395/612 |
| 5,467,472 | 11/1995 | Williams et al. | 395/601 |
| 5,479,656 | 12/1995 | Rawlings, III | 395/616 |
| 5,506,983 | 4/1996 | Atkinson et al. | 395/601 |
| 5,515,536 | 5/1996 | Corbett et al. | 395/685 |
| 5,524,202 | 6/1996 | Yokohama | 395/615 |
| 5,535,319 | 7/1996 | Pascoe et al. | 395/786 |
| 5,537,526 | 7/1996 | Anderson et al. | 395/777 |
| 5,613,124 | 3/1997 | Atkinson et al. | 395/133 |
| 5,634,019 | 5/1997 | Koppolu et al. | 395/335 |

OTHER PUBLICATIONS

"Interleaf Explains Its Active Document Technology", Computergram International, Apr. 21, 1991.

Sherer, Paul M. "Gates' Crusade: Information for all: Vision Builds on GUI Model", PC Week, Nov. 12, 1991, v7, n45, p. 1(2).

Walter, Mark "Compound Documents: Interchange and Integration", The Seybold Report on Desktop Publishing, Jul. 22, 1991, v5, n11, p10(16).

Petrosky, Mary "Microsoft's Master Plan", LAN Technology, Apr. 1991, v7, n4, p. 71(4).

"Go's Got the Most Modern OS Around", P.C. Letter, Jan. 28, 1991, v7, n2, p. 1(3).

Petzold, Charles "1989: The Year in Operation Systems", PC Magazine, Jan. 16, 1990, v9, n1, p. 172(1).

Petzold, Charles "Windows 3.0 May Be Neat . . . But OS/2 is Even Better", PC Magazine, Sep. 11, 1990, v9, n15, p. 202(2).

Sherer, Paul M. "Micorsoft's OLE is Missing Major Feature:Developers Still Plan to Implement Object–Linking Specification",PC Week, Dec. 17, 1990, v7, n50, p. 13(1).

Fletcher et al. "A Robust Algorithm for Text String Separation from Mixed Text/Graphics Images", IEEE Transactions on Pattern Analysis and Machine Intelligence, v10, n6, Nov. 1988.

Pollack et al. "An Object–Oriented Distributed Operating System", COMPCON Spring '90 IEEE Computer Society Int'l Conference, pp. 143–152, 1990.

Hailpern et al. "Extending Objects to Support Multiple Interfaces and Access Control", IEEE Transactions on Software Engineering, v16, n11, Nov. 1990.

Duncan, Ray "Redefining the Programming Paradigm: The Move Toward OOPLS", PC Magazine, Nov. 13, 1990, v9, n19, p. 526(4).

Dawson, Frank R. "Implementation of the Computer Graphics Metafile at McDonnell Douglas", INFOCOM Mar. '88, pp. 752–758.

McCrosky, Carl "The Elimination of Intermediate Containers in the Evaluation of First–Class Array Expressions", IEEE Computer Languages, 1988 International Conference, Oct. 1988, pp. 135–141.

Duncan, Ray, "Design Goals and Implementation of the New High Performance File System," *Microsoft Systems Journal*, Sep. 1989, pp. 1–13.

Stubbs, Frances, "IBM's PC Filing System," *Electronics & Wireless World*, No. 1608, Great–Britain, Oct. 1986, pp. 45–46.

Tanenbaum, "Operating Systems: Design and Implementation," Prentice–Hall, Englewood Cliffs, N.J., 1987, pp. 251–273, Jul. 1, 1987.

METHOD AND SYSTEM FOR STORING AND ACCESSING DATA IN A COMPOUND DOCUMENT USING OBJECT LINKING

CROSS-REFERENCE TO RELATED APPLICATION

This application is a division of U.S. patent application Ser. No. 07/909,533, filed Jul. 6, 1992 now U.S. Pat. No. 5,506,983 issued on Apr. 9, 1996.

TECHNICAL FIELD

This invention relates to a method and system for data storage and, more particularly, to a method and system for storing and accessing data in a compound document.

BACKGROUND OF THE INVENTION

Computer operating systems typically include a subsystem called a file system. A file system stores data in files. A file system provides an application programming interface (API) to facilitate accessing data stored on disk or other long-term storage medium. A file system API provides various functions that are invoked by an application program to access the data. Application programs control the internal format of a file and determine which data to store in which files. A file system typically allows files to be grouped into directories. Each directory may contain many files and many sub-directories. The sub-directories may also contain files and other sub-directories. A file system that groups files into directories and sub-directories is referred to as hierarchical file system.

Many application programs need to access various types of data. For example, word processing programs may combine data that is in text, graph, and spreadsheet format into a single document. A text format is known as the native format for word processing programs. A user of a word processing program may specify that graph or spreadsheet data that is stored in a file is to be included in the document. To do so, word processing programs may import data from files generated by a graph program or a spreadsheet program. Word processing programs typically need to know not only the internal format of the graphic and spreadsheet files, but also how to display or print the graph and spreadsheet data.

The marketability of a word processing program is enhanced by its ability to import data stored in many formats. However, it can be very time-consuming and expensive to adapt a word processing program to access data in a specific non-text format. To adapt to a word processing program, the developer would need a complete description of the specific format and then develop code to print, display, and possibly store the data. The effort needed to adapt a word processing program to a specific format is increased when the format is defined by another vendor. The vendor may not publish a complete specification of the format or may change the format without notice. Consequently, an application program developer may choose to support only a few of the more popular file formats other than the native file format.

One solution that has been suggested is that word processing programs invoke the application program that generated the data in the specific non-text format to display or print the non-text data that is part of a word processing document. For example, if a document incorporates a graph, then the word processing program would invoke the graph program that generated the data to print or display the graph or to perform some other task using the data. However, unless the graph program was developed specifically to be invoked by a particular word processing program, it may not be practicable to invoke the graph program. Graph programs typically expect data to be stored in a certain format and in a file with only graph data.

Several approaches have been suggested to allow a word processing program to invoke other programs to print, display, or otherwise process non-text data that is part of a word processing document. A first approach modifies each of the programs that generate the non-text data so that they know the internal format of the word processing document, can retrieve the non-text data from the document, and can process the retrieved data. This approach can be expensive because the programs would need to know the internal format for each word processing program.

A second approach stores each component of the word processing document in a separate file. Using this approach, data would be stored in the native format of each application program. Thus, the application program could be invoked to process the native data directly. However, this second approach jeopardizes the integrity of the word processing document. Users typically can delete a file using the operating system commands. A user could delete one of the files that is part of a word processing document. The word processing document would then have a link to a deleted file.

The problems encountered become complicated when the non-text data incorporated can additionally include other non-text data belonging to different programs. This situation is referred to as the arbitrary nesting of data. For example, a word processing document can contain a spreadsheet table which in turn contains a sound annotation. If a user wishes to edit the sound annotation, the word processing program invokes the spreadsheet program and tells it to invoke the sound editor. The sound editor must be able to locate its non-text data.

Additional complications occur if a user, by virtue of conceptually placing non-text data in a word processing document, expects to be able to edit the non-text data and only permanently save the changes when the user decides to save the changes to the word processing document. The programs invoked to process the non-text data must coordinate any changes made with the word processing program.

One approach is to modify each program to support a flag telling the program to save all changes to a designated temporary file. The word processing program is then responsible for overwriting the file containing the non-text data with the temporary file when it chooses to save the complete set of modifications to the word processing document.

Another approach is for the word processing program to save a snapshot of the non-text data file before it invokes the program to modify this data. The word processing program can then overwrite any changes made by the program invoked to process the non-text data if the user decides not to save the changes to the word processing document.

SUMMARY OF THE INVENTION

It is an object of the present invention to provide a method and system for interfacing application programs to compound documents.

It is another object of the present invention to provide a method and system for organizing the layout of a compound document in an efficient manner.

It is another object of the present invention to provide a method and system for implementing compound document system on an arbitrary storage medium.

These and other objects, which will be apparent as the invention is more fully described below, are provided by a method and system for interfacing an application program with a compound document storage system. The present invention defines an interface which an application program uses to manipulate compound documents. In a preferred embodiment, this interface is implemented in a multilayered architecture. The first layer provides methods which an application program uses to access a compound document using the functions of the second layer. The second layer maps requests to store data in the compound document to a storage format using the functions of the third layer. The third layer maps request to write to a file to an arbitrary storage medium.

DETAILED DESCRIPTION OF THE INVENTION

In a preferred embodiment of the present invention, objects are stored within a compound document in an object hierarchy. Objects are encapsulated, linked or embedded data that is created typically by an application other than the one used to create the compound document. (The reference Budd, T., "An Introduction to Object-Oriented programming," Addison-Wesley Publishing Co., Inc., 1991, provides an introduction to object-oriented concepts and terminology.) The object hierarchy allows objects to contain subobjects to an arbitrary nesting level. The object hierarchy is analogous to the typical file system hierarchy. The present invention provides two abstract classes for manipulating objects within an object hierarchy. The first abstract class is referred to as the IStorage interface. The IStorage interface provides methods for grouping objects in conceptually the same way as a file system directory groups files and subdirectories. An IStorage instance is an interface to a storage. The second abstract class is referred to as the IStream interface. The IStream interface provides methods for reading and writing data in conceptually the same way as a file system file reads and writes data. A storage can contain storage instances and streams. An IStream instance is an interface to a stream.

The present invention maps an object hierarchy into a single file system file. Thus, multiple objects can be stored within a single file. In addition, the present invention provides a multiple stream (multistream) interface to the file. A stream is an input/output handle to a file, which can be thought of as mapping to a unique seek pointer. Each object within a single file conceptually has an entire storage to itself, which may contain multiple streams and storages. The multiple stream interface takes care of mapping these streams of each object into the single file system stream. In addition, the present invention allows each object to have multiple streams. An object is conceptually stored in a storage instance and its data is stored in one or more stream or storage instances within the storage.

Figure 1:
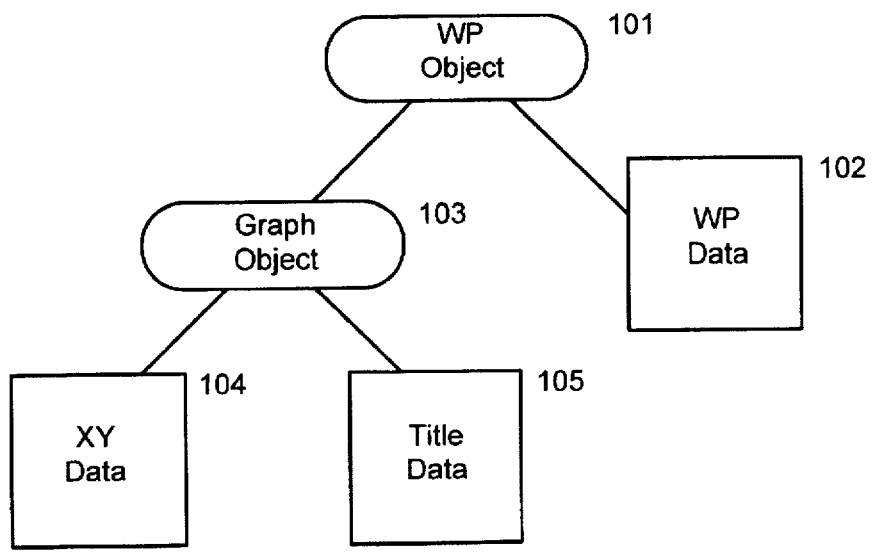
FIG. 1 is an object hierarchy for a sample compound document.

FIG. 1 is an object hierarchy for a sample compound document. The IStorage instances are indicated by the oblong blocks, and the IStream instances are indicated by the square blocks. The sample compound document is a word processing document, which has an embedded graph. The compound document contains a root IStorage instance 101, which contains an IStream instance 102 and an IStorage instance 103. The IStream instance 102 contains data in the native format of the word processing program. The IStorage instance 103 corresponds to the embedded graph and contains IStream instances 104 and 105. IStream instance 104 contains XY data for the graph, and the IStream instance 105 contains the graph title. IStream instances 104 and 105 store the data in the native format of the graph program.

Figure 2:
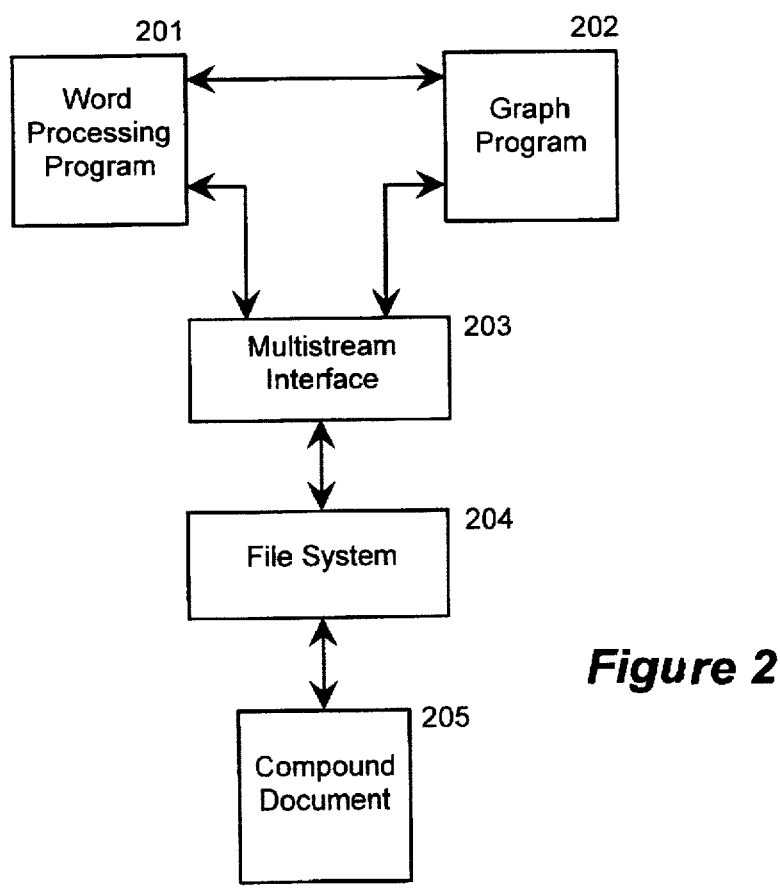
FIG. 2 is a block diagram showing the relationship between the multistream interface and the file system and application programs.

FIG. 2 is a block diagram showing the relationship between the MultiStream interface and the file system and application programs. The word processing program 201 and the graph program 202 interact with the MultiStream interface 203. The MultiStream interface 203 interacts with the file system 204 to affect the storage of the object hierarchy in a compound document 205. To manipulate the graph object, the word processing program 201, through standard interprocess communication means, sends messages to the graph program 202 identifying the graph object within the compound document and the action to perform in the object. A typical action might be to display or to edit the graph object. The graph program 202 would then access the graph object through the MultiStream interface 203.

Figure 3:
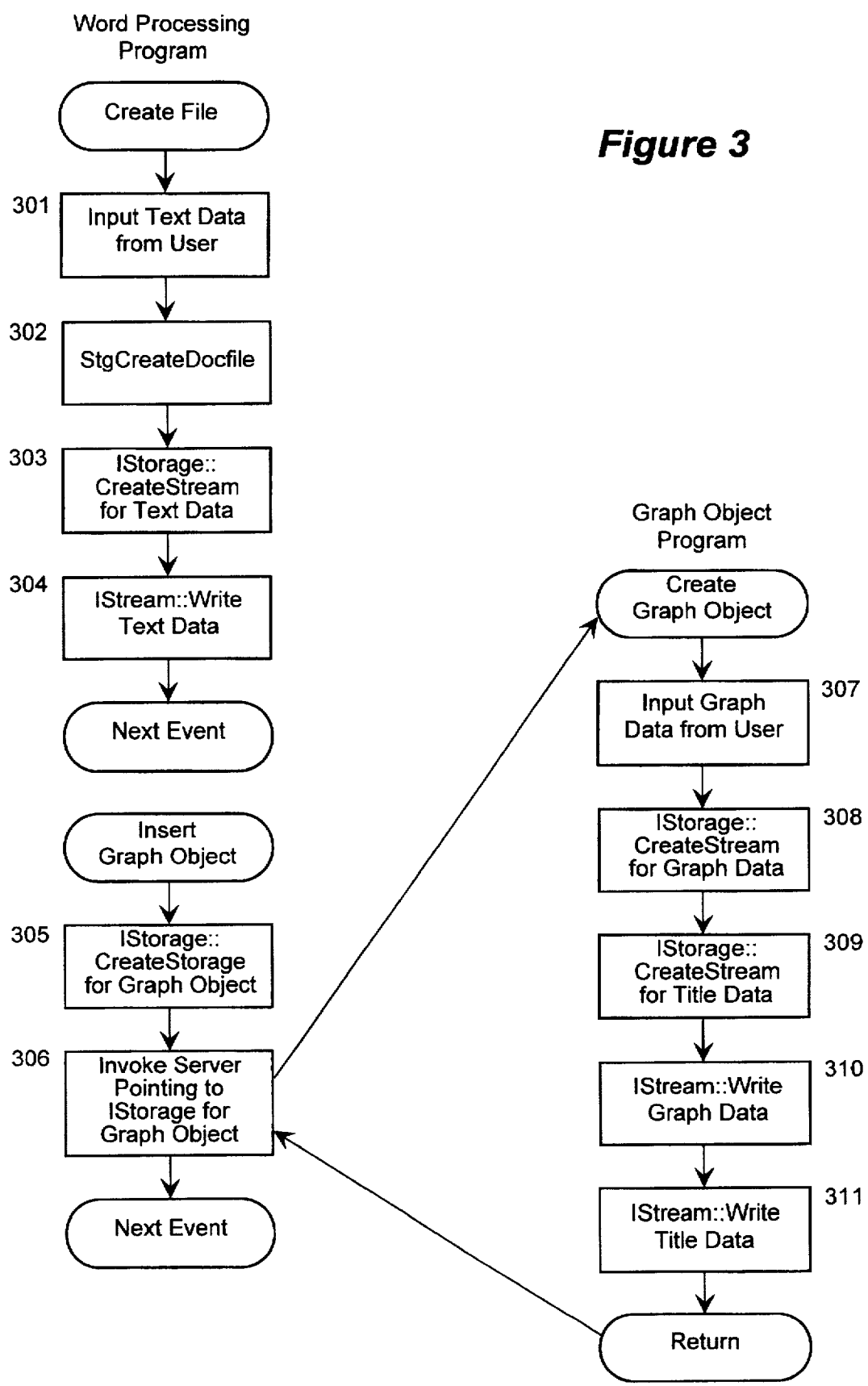
FIG. 3 is a flow diagram showing the creation of a compound document according to the present invention.

FIG. 3 is a flow diagram showing the creation of a compound document according to the present invention. In this example, a user enters text data using the word processing program (client) and then requests that the graph object be inserted in the document. In response to the request, the graph object program (server) is sent a message indicating where to store the graph object. The user then inputs graph data using the graph server, and the graph server stores the graph object as indicated and returns. In steps 301 through 304, the word processing program creates a compound document file (document file) and stores text data input by the user. In step 301, the word processing program receives text data from the user. In step 302, the word processing program creates a document file by invoking the function StgCreateDocfile provided by the MultiStream interface. This function creates a document file and returns a pointer to an IStorage instance, which is the root IStorage instance for the document file. In step 303, the word processing program creates a stream within the root IStorage instance to store the text data. The word processing program invokes the method CreateStream of the root IStorage instance which returns a pointer to the IStream instance for the created stream. In step 304, the word processing program writes the text data to the newly created stream using the Write method of the IStream instance. The word processing program then waits to receive the next event from the user. Steps 305 and 306 are performed when the user indicates that a graph object should be inserted. In step 305, the word processing program creates an IStorage instance within the root IStorage instance in which to store the graph object by invoking the CreateStorage method of the root IStorage instance. In step 306, the word processing program invokes the graph server specifying the newly created IStorage instance that is to hold the graph object. In steps 307 through 311, the graph server creates a graph object and stores it in the storage of the specified IStorage instance. In step 307, the graph server inputs graph data from the user. In step 308, the graph server creates a stream for the graph data by invoking the CreateStream method for the specified IStorage instance. In step 309, the graph server creates a stream for the title data by invoking the CreateStream method of the specified IStorage instance. In step 310, the graph server writes the graph data to the newly created stream by invoking the Write method of the IStream instance for the graph data. In step 311, the graph server writes the title data into the newly created stream by invoking the Write method of the IStream instance for the title data. The graph server then returns to the word processing program. The word processing program then waits for the user to enter the next event.

MultiStream Interface

As discussed above, the MultiStream Interface defines an IStorage and IStream interface. The IStorage interface and IStream interface define a set of pure virtual methods which implement the hierarchical storage of the present invention. A pure virtual method is a function that has a declaration but no code implementation. These interfaces allow application programs to be developed independently of the particular implementation of the interfaces. Although a preferred implementation is described below, application programs which use the IStorage and IStream interfaces can execute without modification when attached to any implementation (except for linking to the methods of the implementation).

The IStorage and IStream interfaces are described below. Also described are two functions that support the creation and opening of document files.

Access Modes

The present invention allows the storages and the streams to be opened with various access modes. The access modes control whether the element (storage or stream) is opened in transacted mode, read or write mode, and denyread or denywrite mode.

When an element is opened in transacted mode, changes to it are buffered until either a transaction commit or revert is specified. Conversely, when an element is opened in direct mode, no buffering occurs. Conceptually, direct mode is functionally equivalent to a transaction mode in which every change is immediately followed by a commit. In transacted mode, committing of changes are subject to the transaction mode of the parent storage. Each element is nested within the transactions of its parent storage. Thus, a commit of the root storage actually changes the file system file. The act of committing a transaction on an element passes the changes to its parent storage instance. The parent storage instance, if opened in transacted mode, accumulates the committed changes of its elements. Thus, the changes percolate upwards toward the root storage. When in transacted mode, all changes to the elements are buffered. In particular, the creation or destruction of elements within a storage is transacted.

The present invention allows for various levels in the object hierarchy to be opened in transacted or direct mode. As discussed below in detail, when a storage is opened in direct mode and it contains an element opened in transacted mode, then when the element commits its transaction, those changes pass through the parent IStorage instance to the parent instance above.

A storage or stream may be opened in read and/or write mode. When a stream is not opened in read mode, then an attempt to read the stream returns an error. When a storage is opened in read mode, then the enumerate methods (described below) are enabled. If a storage is not opened in read mode, then its elements cannot be opened in a read mode.

If an element is opened in write mode, then its changes can be committed. Specifically, unless an element is opened in write mode, an attempt to commit will return an error. As discussed above, when an element is opened in direct mode, a commit is done after every change. Thus, in direct mode, the write mode must be specified in order to affect the change.

If a storage or a stream is opened in denyread mode, then the stream or storage cannot be subsequently opened in the read mode. The denyread mode is only effective for other openings of the element through the same parent IStorage instance.

If a storage or a stream is opened in denywrite mode, then subsequent requests to open the stream or storage in write mode are prohibited. The denywrite mode is only effective for other openings of the element through the same parent IStorage instance.

StgCreateDocfile

SCODE StgCreateDocFile(lpszName, grfMode, dwIfThere, reserved, ppstg)

The StgCreateDocfile function creates a file in the file system as a compound document using the designated name, creates a root storage within the file, and opens the root storage in the designated access mode. The parameter dwIfThere designates the behavior of the function when a file of the designated name exists. If such a file exists, the function optionally returns an error, deletes it and creates a new file, or replaces the file with a file that contains a root storage containing a stream named "CONTENTS." The stream contains the data that was in the old file. If the designated name is NULL, then a temporary document file with a unique name is created. The function instantiates an IStorage instance for the root storage and returns a pointer to it.

StgOpenStorage

SCODE StgOpenStorage (lpszName, pstgPriority, grfMode, snbExclude, reserved, ppstgOpen)

The StgOpenStorage function opens an existing compound document of the designated named in the designated access mode. If the file does not exist, or if it is not a storage, then an error is returned. The function returns a pointer to the open IStorage instance.

IStorage Interface

Table 1 defines the IStorage interface. The parameters of the methods of the IStorage interface are described in Table 2. The behavior of each of the methods is specified following the tables. An IStorage instance can contain an IStream instance and IStorage instance, which are referred to as elements of the parent IStorage instance.

TABLE 1

| Class | IStorage | |
|---|---|---|
| { | | |
| virtual | SCODE | Release()=0; |
| virtual | SCODE | CreateStream(lpsName, grfMode, dwIfThere, reserved, ppstm)=0; |
| virtual | SCODE | OpenStream(lpszName, grfMode, reserved, ppstm)=0; |
| virtual | SCODE | CreateStorage(lpszName, grfMode, dwIfThere, reserved, ppstg)=0; |
| virtual | SCODE | OpenStorage(lpszName, pstgPriority, grfMode, snbExclude, reserved, ppstg)=0; |
| virtual | SCODE | CopyTo(pstgDest)=0; |
| virtual | SCODE | Commit(grfCommitFlags)=0; |
| virtual | SCODE | Revert()=0; |
| virtual | SCODE | EnumElements(reserved1, reserved2, reserved3, ppenum)=0; |
| virtual | SCODE | DestroyElement(lpszName)=0; |
| virtual | SCODE | RenameElement(lpszOldName, lpszNewName)=0; |
| virtual | SCODE | Stat(pstatstg)=0. |
| } | | |

TABLE 2

| Argument | Description |
|---|---|
| lpszName | the name of a stream or storage (All elements within an IStorage instance are within the same name space.) |
| grfMode | the access mode for an IStream or IStorage instance |
| dwIfThere | when creating an IStorage or IStream instance, dwIfThere indicates the behavior when an element of the same name already exists |
| reserved | must be zero |
| ppstm | a pointer to an IStream instance |
| ppstg | a pointer to an IStorage instance |

IStorage::Release

The Release method closes the specified IStorage instance, which makes the instance invalid. (In the following, the term "specified" refers to the instance for which the method is invoked, and the term "designated" refers to a parameter.) In a preferred embodiment, the IStorage interface includes a method that increments a reference counter. The Release method decrements the reference counter and only invalidates the specified instance when the count goes to 0.

IStorage::CreateStream

The CreateStream method creates a new stream of the designated name within the storage of the specified IStorage instance and opens the stream in the designated access mode. The parameter dwIfThere indicates the behavior of the method when an element of the designated name already exists. If such a element exists, the method optionally returns an error or deletes the existing element and creates a new stream. The method instantiates an IStream instance for the created stream and returns a pointer to it.

IStorage::OpenStream

The OpenStream method opens an existing stream of the designated name within the storage of the specified IStorage instance in the designated access mode. If a stream of the designated name does not exist within the storage, or it cannot be opened in the designated access mode, an error is returned. The access mode is discussed in detail below. The method instantiates an IStream instance for the open stream and returns a pointer to it.

IStorage::CreateStorage

The method CreateStorage creates a new storage of the designated name within the specified IStorage instance and opens the new storage in the designated access mode. The parameter dwIfThere indicates the behavior of the method when an element of the designated name already exists. If an element of the same name exists, the method optionally returns an error or deletes the existing element and creates a new storage. If a stream of the same name exists, then the stream is replaced by a new storage that contains one stream named "CONTENTS." This stream contains the data that was in the old stream. The method instantiates an IStorage instance (and an IStream instance, if necessary) for the created storage and returns a pointer to it.

IStorage::OpenStorage

The OpenStorage method opens an existing storage of the designated name within the specified Istorage instance in the designated access mode. If a storage of the designated name does not exist or it cannot be opened in the designated access mode, an error is returned.

IStorage::CopyTo

The method CopyTo copies the entire contents of the storage of the specified IStorage instance into the designated storage. This method replaces the contents of the designated storage. The designated storage may be a different implementation than the specified storage. Thus, the CopyTo implementation should only use the methods of the designated storage.

IStorage::Commit

The Commit method commits any transactions for the specified storage. The behavior of the Commit method depends upon the access mode in which the specified storage was opened. If the specified storage was opened in direct mode, then this method has no effect, with one exception. If the specified IStorage instance is a root storage, then this method acts like a traditional "flush" operation, which ensures that any internal memory buffers are written out to the underlying storage device.

If the specified storage was opened in transacted mode, then this method causes any changes that have been made to the specified storage since it was opened or last committed (whichever is later) to be reflected in the parent of the specified storage. Permanent update of these changes is subject to the transaction mode of the parent storage. That is, the parent storage may be transacted, in which case a commit would need to be done on the parent storage before the changes are actually written to the storage device. This method has no effect on uncommitted transactions of the currently opened elements of specified storage. In particular, this method does not automatically commit changes within the elements of the specified storage. The action of committing in essence "publishes" the changes that occur in the specified storage to the parent storage.

There are two modes for committing a root storage as designated by the parameter grfCommitFlags. In the first mode, the committed changes are written to the storage device in a robust manner. In a second mode, the data within the storage device can be overwritten with the committed changes. In the robust manner, all changes are written to unused space in the underlying storage device. The storage device is enlarged as necessary. Once this has been completed, a single write is performed on the storage device to indicate that the new data is to be used in place of the old data. The old data becomes free space that can be used during the next commit.

A third commit mode indicates that the commit should be made only if the current persistent content of the storage device is the same content as that upon which the changes are based. If the content is not the same, then an error code is returned.

IStorage::Revert

The Revert method discards all changes that have been committed to the storage by its elements, since the specified storage was opened or last committed (whichever is later). After completion of this method, any elements that are opened for the specified storage are invalid (an error is returned by all methods of these elements except Release).

IStorage::EnumElements

The EnumElements method enumerates the elements immediately contained within the storage for the specified IStorage instance. The specified storage must be opened in read mode.

IStorage::DestroyElement

The DestroyElement method removes the element of the designated name from the specified storage instance. Any openings of the destroyed element (through the specified storage) become invalid. If the element does not exist, then an error is returned.

IStorage::RenameElement

The RenameElement method renames the designated element in the specified storage from the old name to the new name. If the new name already exists or if the old name does not exist, an error is returned.

IStorage::Stat

The method Stat returns statistical information about the storage specified Istorage instance.

IStream Interface

Table 3 defines the IStream interface. The parameters of the methods of the IStream interface are described in Table 4. The IStream interface defines a seek pointer that is used as the location in the stream for each read and write. The behavior of each of the methods is specified in the following.

TABLE 3

| Class | IStream |
|---|---|
| { | |
| virtual | SCODE Release()=0; |
| virtual | SCODE Read(pv, cb pcbRead)=0; |
| virtual | SCODE Write(pv, cb, pcbWritten)=0; |
| virtual | SCODE Seek(dlibMove, dwOrigin, plibNewPosition)=0; |
| virtual | SCODE SetSize(libNewSize)=0; |
| virtual | SCODE Clone(ppstm)=0; |
| virtual | SCODE CopyTo(ppstm, cb, pcbRead, pcbWritten)=0; |
| virtual | SCODE Commit(grfCommitFlags)=0; |
| virtual | SCODE Revert()=0; |
| virtual | SCODE LockRegion(cb, dwLockType)=0; |
| virtual | SCODE UnlockRegion(cb, dwLockType)=0; |
| virtual | SCODE Stat(pstatstg)=0; |
| } | |

TABLE 4

| Argument | Description |
|---|---|
| pv | pointer to a buffer to read or write. |
| cb | the number of bytes. |
| ppstrm | pointer to an IStream instance |
| pcbWritten | number of bytes actually written to stream, may be NULL if caller not interested. |

TABLE 4-continued

| Argument | Description |
|---|---|
| pcbRead | number of bytes actually read from a stream, may be NULL if caller not interested. |
| dlibMove | displacement to be added to the location indicated by dwOrigin |
| dwOrigin | seek mode |
| plibNewPosition | updated seek pointer |
| libNewSize | size of the new stream |
| dwLockType | type of lock |

IStream::Release

The Release method closes the stream of the specified IStream instance. In a preferred embodiment, the IStream interface includes a method that increments a reference counter. The Release method decrements the reference counter and invalidates the specified IStream instance when the count goes to 0.

IStream::Read

The Read method reads the designated number of bytes into the designated buffer from the stream of the specified IStream instance starting at the current seek pointer. The method returns the number of bytes actually read. The method adjusts the seek pointer by the number of bytes actually read. If the stream is not open in read mode, then an error is returned. The number of bytes actually read may be fewer than requested if the end of the stream is encountered during the read.

IStream::Write

The Write method writes the designated number of bytes from the designated buffer into the stream of the specified IStream instance starting at the current seek pointer. When a non-zero byte count is specified and the seek pointer is currently past the end of the stream, then the size of the stream is increased to reach the seek pointer. The added bytes are not initialized. If the stream is not open in the appropriate mode, then an error is returned. The number of bytes actually written is returned. The seek pointer is adjusted by the number of bytes actually written.

IStream::Seek

The Seek method adjusts the location of the seek pointer for the stream of the specified IStream instance. It is an error to seek before the beginning of the stream. It is not an error to seek past the end of the stream. The parameter dlibMove indicates the displacement from either the beginning of the stream, the current seek pointer, or the end of the stream, as designated by parameter dwOrigin. The new seek pointer is returned in parameter plibNewPosition, which may be null if the caller is not interested in the new seek pointer.

IStream::SetSize

The SetSize method changes the size of the stream of the specified IStream instance to be that designated by the parameter libNewSize. The seek pointer is not affected by this operation. The stream is either increased in size or decreased in size. If the stream is increased in size, the contents of the new bytes are undefined.

IStream::Clone

The Clone method creates a new IStream instance that points to the same underlying stream as the specified IStream instance. Changes to the stream through one IStream instance are immediately visible through the other IStream instance. The locking state (discussed below) is shared between the two IStream instances. However, the cloned IStream instance does have its own seek pointer, which is independent of the seek pointer of the specified IStream instance. The initial setting of the seek pointer in the cloned IStream instance is the same as the current setting of the seek pointer in the specified IStream instance at the time of the Clone method is invoked.

IStream::CopyTo

The CopyTo method copies the designated number of bytes from the stream of the specified IStream instance starting at its current seek pointer to the stream of the designated IStream instance starting at its current seek pointer. The number of bytes actually read or written is returned. The seek pointer for each IStream instance is adjusted by the number of bytes actually read or written. If the IStream instances are not open with the appropriate access modes, an error is returned. This method is semantically equivalent to a read followed by a write.

IStream::Commit

The Commit method behavior depends upon the mode in which the IStream instance is open. In direct mode, this method has no behavior. In transacted mode, this method causes changes that have been made to the IStream instance since it was opened or last committed, whichever is later, to be reflected in the parent storage. The designated commit mode operates in an analogous way to the description in the IStorage::Commit method.

IStream::Revert

The method Revert has a behavior that depends upon the mode in which the stream of the specified IStream instance is open. In direct mode, this method performs no operation. In transacted mode, all changes that have been made to the IStream instance since the IStream instance was opened or last committed, whichever is later, are discarded.

IStream::LockRegion

The LockRegion method attempts to lock a region of the stream of the specified IStream instance. The region begins with the current seek pointer and extends for the designated number of bytes toward the end of the stream. It is legal to indicate a region that extends past the current end of the stream. The supporting of region locking on stream is optional. This method supports two types of locking: locking to exclude other writers (write lock) and locking to exclude other writers and readers (exclusive lock). If a write lock is granted, then the designated region of the stream may be accessed by the Read method from any IStream instance of the underlying stream. However, if a Write method is invoked through any IStream instance, except the specified IStream instance and its clones, then an error is returned. If an exclusive lock is granted, then both the Read and Write methods invoked through other IStream instances will return an error. If a requested mode is not supported by an implementation, then an error message is returned. If the requested lock is supported but cannot be presently granted because of other locks, then an error is returned. Any region locked with this method must later be specifically unlocked using the UnlockRegion method with exactly the same seek pointer, the same byte count, and the same lock type. Thus, two adjacent regions cannot be locked separately and then be unlocked with the single unlock call. All locks on a stream through an IStream instance must be explicitly unlocked before the IStream instance is released.

IStream::UnlockRegion

The UnlockRegion method unlocks a previously locked region of the stream of the specified IStream instance.

IStream::Stat

The Stat method returns information about the stream of the specified IStream instance.

Implementation

Figure 4:
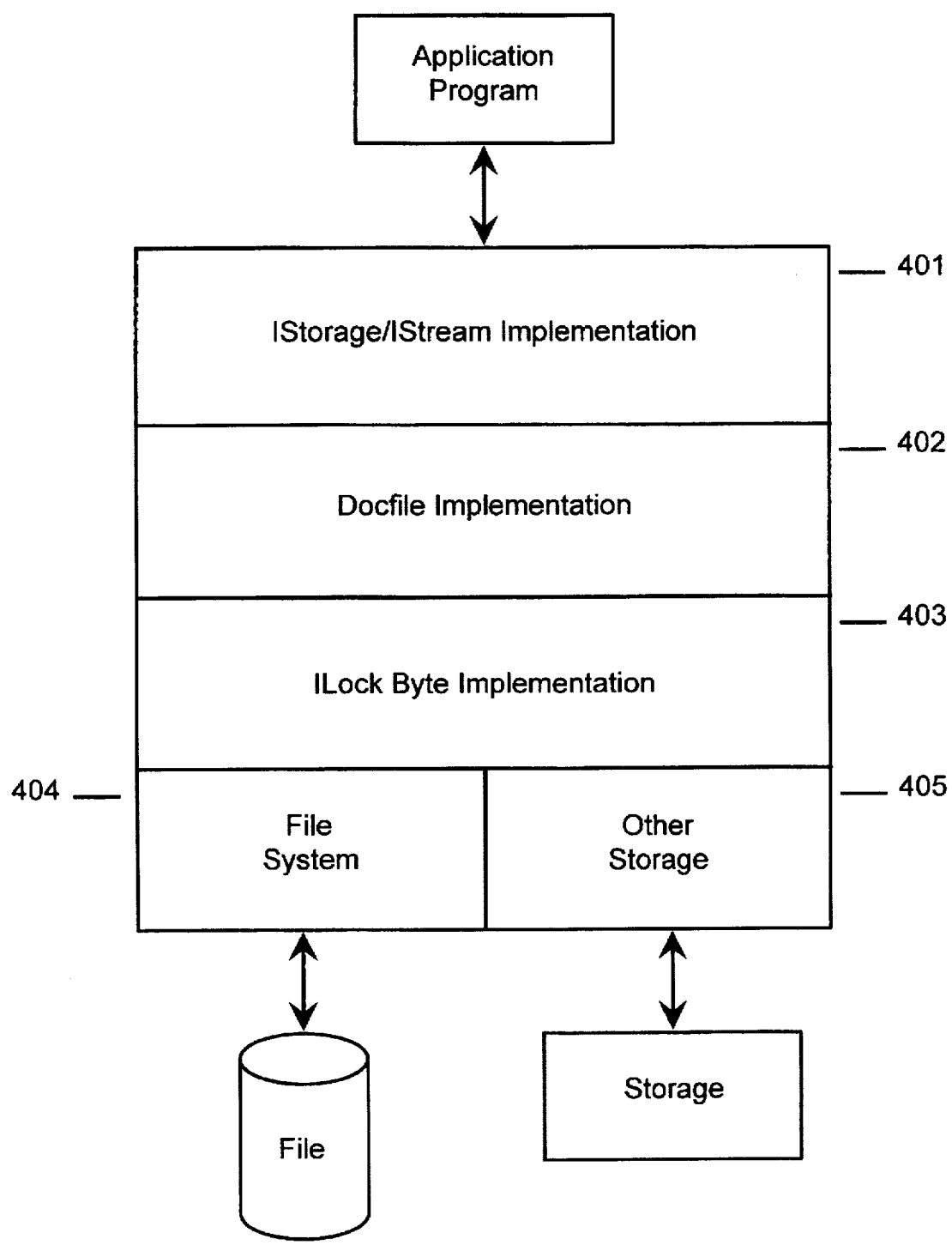
FIG. 4 is a block diagram showing an overview of a preferred implementation of the present invention.

FIG. 4 is a block diagram showing an overview of a preferred implementation of the present invention. The preferred implementation uses a layered approach comprising an IStorage/IStream Implementation 401, a Docfile Implementation 402, and an ILockBytes Implementation 403. The preferred implementation is in the C++ language, which is an object-oriented language. Consequently, the implementation is described in object-oriented terms. The IStorage/IStream Implementation 401 provides functions to create and open a document file and methods of the IStorage and IStream interfaces. The support IStorage/IStream Implementation 401 implements transaction and invokes the services of the Docfile Implementation 402. The DocFile Implementation 402 provides an interface to the persistent storage of the storages and streams within a document file. The DocFile Implementation 402 maps the storages and streams within a document file. The DocFile Implementation 402 maps the storages and streams to the underlying persistent storage using the ILockBytes interface. The ILockBytes interface is defined as an abstract class that defines methods for manipulating persistent storage. In the preferred implementation, the ILockBytes Implementation 403 uses the underlying file system to store data. Alternatively, implementation of the ILockBytes interface could use other underlying storage media, such as a data base, as indicated by Other Storage 405.

IStorage/IStream Implementation

Figure 5:
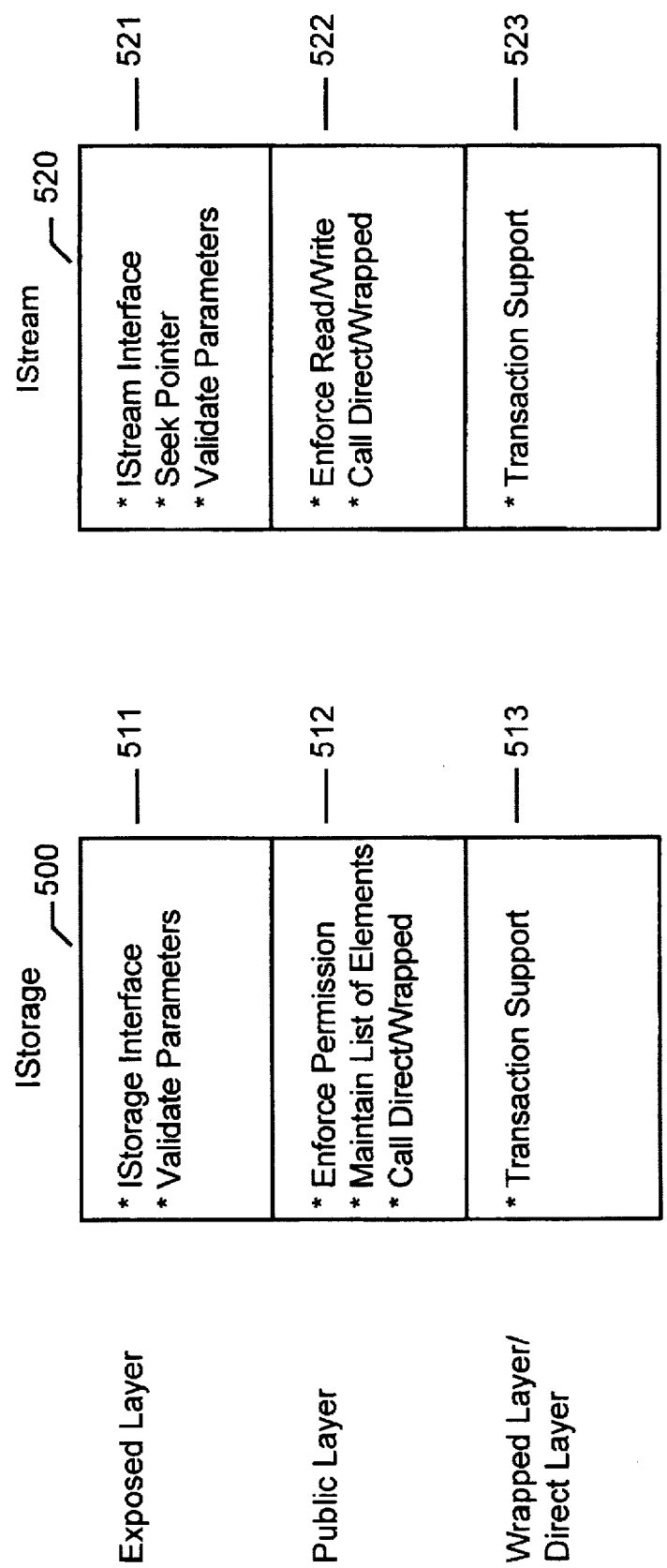
FIG. 5 is a block diagram showing the IStorage and IStream layers.

The IStorage/IStream Implementation 401 uses a layered approach to organize the data and methods needed to support the IStorage and IStream interfaces. The preferred implementation organizes the IStorage and IStream instances into three layers: an exposed layer, a public layer, and a wrapped layer. FIG. 5 is a block diagram showing the IStorage and IStream layers. Each layer is implemented as an instance of a C++ class. The exposed layer 511 of the IStorage instance 510 provides the methods of the IStorage interface. The methods of the exposed layer 511 validate the parameters and invoke the methods of the public layer 512. The public layer 512 maintains a list of the storage elements, enforces the access modes, and invokes the methods of the wrapped layer when in transacted mode and invokes the methods a direct layer when in direct mode. The wrapped layer 513 implements the transaction support. The exposed layer 521 of the IStream instance 520 provides the methods of the IStream interface. The methods of the exposed layer 521 validate the parameters, maintain the seek pointer for the stream, and invoke the methods of public layer 522. The public layer 522 enforces the access modes and invokes the methods of the wrapped layer 523 when in transacted mode, and invokes the methods of a direct layer when in direct mode. The wrapped layer 523 implements the transaction support. In a preferred embodiment, the IStream interface is implemented without transaction support. That is, the IStream::Write method writes directly to the next level in the transaction hierarchy. The IStream::Commit and IStream::Revert methods, while supported, perform no operation. The layers of the IStorage and IStream implementation are described below in detail.

Exposed Layer

The exposed layer is the outermost layer and implements the methods of the IStorage and IStream interfaces. The exposed layer validates the parameters of the IStorage and IStream methods. In a preferred embodiment, the seek pointer for streams is not transacted. The only layer that is aware of seek pointers is the exposed layer. The exposed layer of the IStream implementation maintains the seek pointer. When the methods of the exposed layer invoke the methods of the public layers to read and write, the methods are passed the offset at which to read or write. Consequently, all internal layers are shielded from having to maintain a seek pointer.

Public Layer

The exposed layer points to the public layer. The public layer enforces most of the access modes for the instance. The public layer maintains a list of all its elements and their access modes. It uses this list to determine whether to allow or deny a particular access to an element. If an instance is in transacted mode, then the public layer invokes the methods of the wrapped layer, which it points to. Otherwise, the public layer invokes the direct layer.

Wrapped Layer

The wrapped and direct layer both support the same interface and can be used in a polymorphic manner. This allows the public layer to invoke the methods of an abstract interface and not worry about whether it is invoking the wrapped layer or the direct layer. The wrapped layer supports buffering of changes until commit or revert time. The wrapped layer communicates with the direct layer for managing its dirty information (data buffered for a transaction) and for managing its base information (data in the persistent storage). The wrapped layer also enforces certain access modes. For example, the IStorage interface specifies that the write access mode can be requested for any instance, regardless of the access mode of its parent. This means that an instance can be in write mode while its parent is in read-only access. However, the commits of the instance with write access will fail because the parent has read-only access. The direct layer invokes the methods of the DocFile Implementation directly to alter the persistent storage.

Transactioning

In a preferred implementation, each IStorage and IStream instance may be opened in direct or transacted mode. IStorage and IStream instances are instantiated with a wrapped layer when open in transacted mode. The wrapped layer tracks the changes made to its elements and either commits or reverts upon request.

Figure 6:
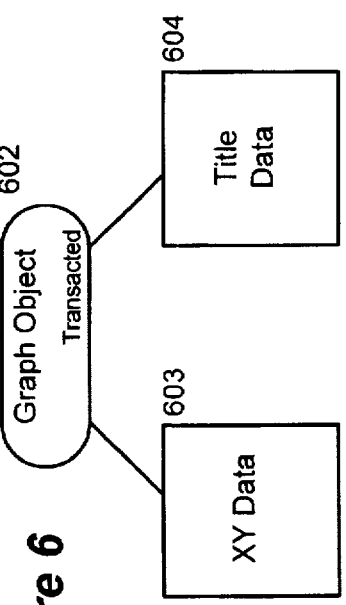
FIG. 6 shows a typical object hierarchy.

Since every IStorage and IStream instance can be opened in transacted mode, each level of the hierarchy of instances can be open in a different mode. FIG. 6 shows a typical object hierarchy. If the root IStorage instance 601 and the graph object IStorage instance 602 are open in a transacted mode, then the root IStorage instance 601 and the graph instance 602 each buffer the changes made to the stream of the XY data 603 and the stream of the title data 604. For example, if a change is made to the title data 604, then the graph object instance 602 buffers these changes in a scratch file. When the graph object storage instance commits its changes, then the root IStorage instance buffers these committed changes in a scratch file. Finally, when the root IStorage instance commits its changes, the persistent storage is only then modified. Conversely, if the graph object IStorage instance is open in direct mode, then the graph object IStorage instance does not buffer the changes of its elements. Rather, the changes are sent directly to the root IStorage, which buffers the changes.

The present invention implements transactioning by maintaining a set of changes (referred to as a transaction level) for each IStorage and IStream instance. These transaction levels buffer committed changes for each element that descends from the instance and the uncommitted changes of the instance itself. A transaction level comprises a linked list of instances of transaction set members. A transaction set member buffers the changes for one element of the IStorage or IStream instance itself. Each transaction level includes a transaction set member for the IStorage or IStream instance itself to buffer the changes to the instance. Additional transaction set members are created when elements are instantiated.

Transaction set members can be either direct or wrapped. A direct transaction set member does not buffer changes that have been made to it. Rather, direct transaction set member allows persistent storage to be directly manipulated. Wrapped transaction set members buffer changes and point to the data upon which the changes are based. For each element, the base data is what its parent thinks is the current state of the element. Each wrapped transaction set member contains two pointers: one pointer points to a direct member manipulating the scratch where the change information is buffered (called the dirty pointer) and the other pointer points to a directed or wrapped member which identifies the base data (called the base pointer). The base pointers of a transaction set members form a chain of transacted versions of a stream or storage. When a stream or storage is opened, its parent IStorage instance is requested to get its base pointer. If the parent does not have a transaction set member for the element, it will instantiate a transaction set member for its element. The parent IStorage instance then requests its parent to get a base pointer for the element and instantiates a transaction set member if needed. Thus, the request may percolate to the root IStorage instance which has access to the persistent file.

Figure 7:
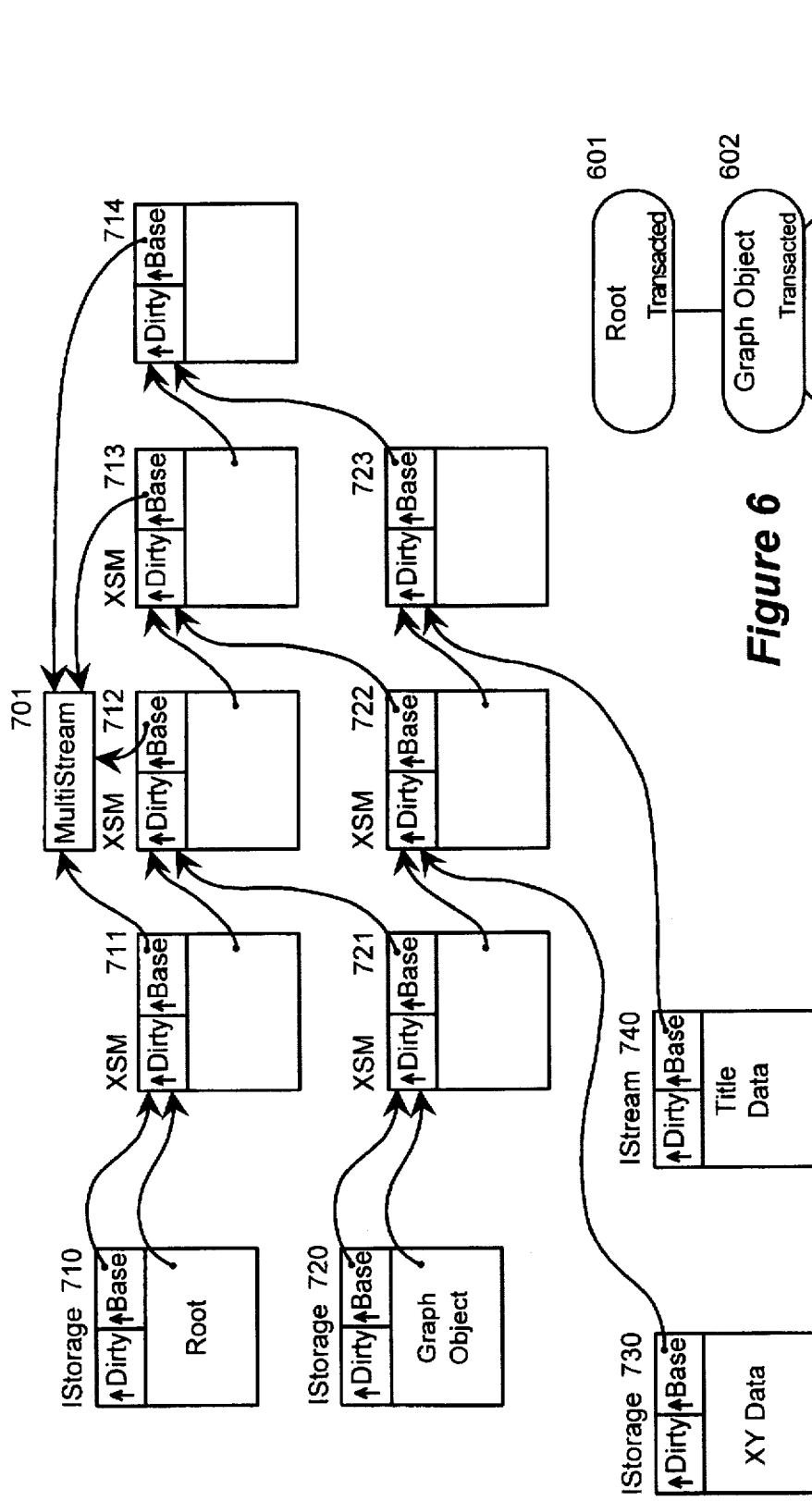
FIG. 7 is a block diagram illustrating the transaction levels in a preferred embodiment.

FIG. 7 is a block diagram illustrating the transaction levels in a preferred embodiment. FIG. 6 is a sample object hierarchy diagram. In this example, the root object and the graph object are open in transacted mode. When the root storage is open in transaction mode, IStorage instance 710 and XSM instance 711 are instantiated. The XSM instance 711 buffers the changes made to the root storage. The XSM instance 711 contains a dirty pointer and a base pointer. The dirty pointer points to a stream in a scratch file where the buffered changes are stored. The base pointer points to the persistent storage. When the graph object storage is opened in transacted mode, the IStorage instance 720 and the XSM instance 721 are instantiated. When initializing the XSM instance 721, the instance requests a base pointer from its parent storage. In this example, IStorage instance 710 creates XSM instance 712 and initializes the dirty pointer to point to a scratch stream and the base pointer to point to the persistent storage. The IStorage instance 710 returns the pointer to XSM instance 712 to the instance 721, which stores the pointer as the base pointer. When the XY data stream is opened in direct mode, the XY data IStream instance 730 is instantiated. The initialization method for the IStream instance requests the parent IStorage for the pointer to its base. The graph object IStorage instance 730 creates a transaction set member for the XY data stream. The XSM instance 722 then requests its parent storage, root IStorage instance 710, for a base pointer. The root IStorage instance 710 instantiates XSM instance 710 for the XY data stream. The root IStorage instance 710 initializes the base pointer of XSM instance 713 to point to the persistent storage and returns a pointer to itself to the XSM instance 722, which stores the pointer as its base. The XSM instance 722 then returns the pointer to itself to the XY data IStream instance 730. The XY data IStream instance 730 stores that pointer as its base.

Figure 8:
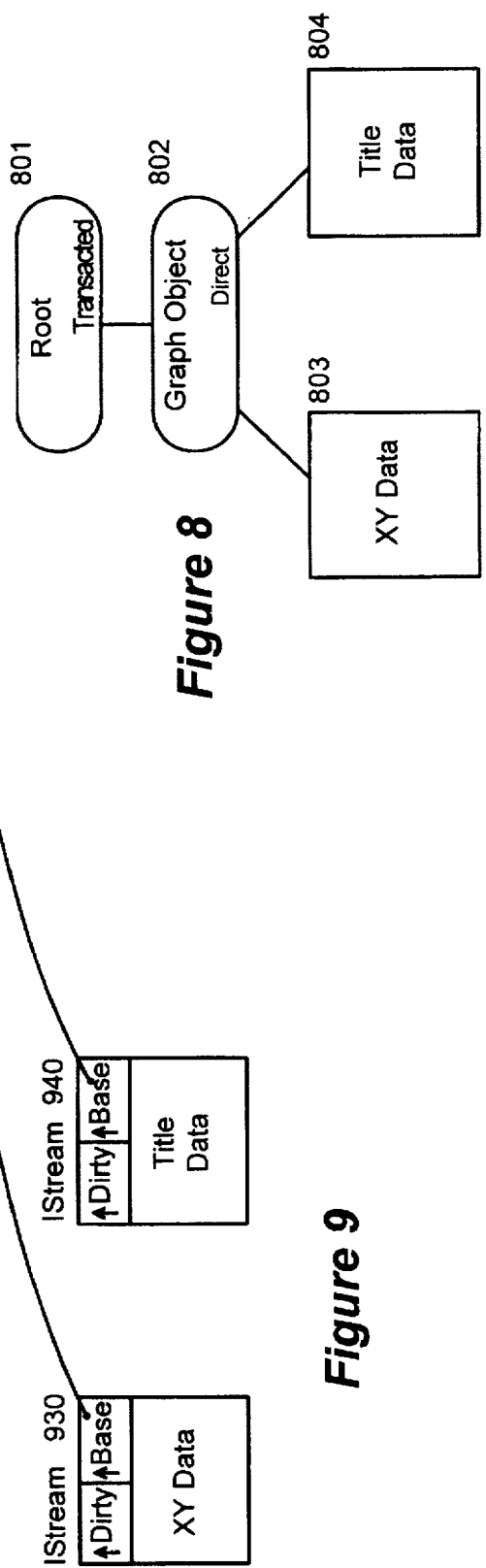
FIG. 8 is a sample object hierarchy diagram.
Figure 9:
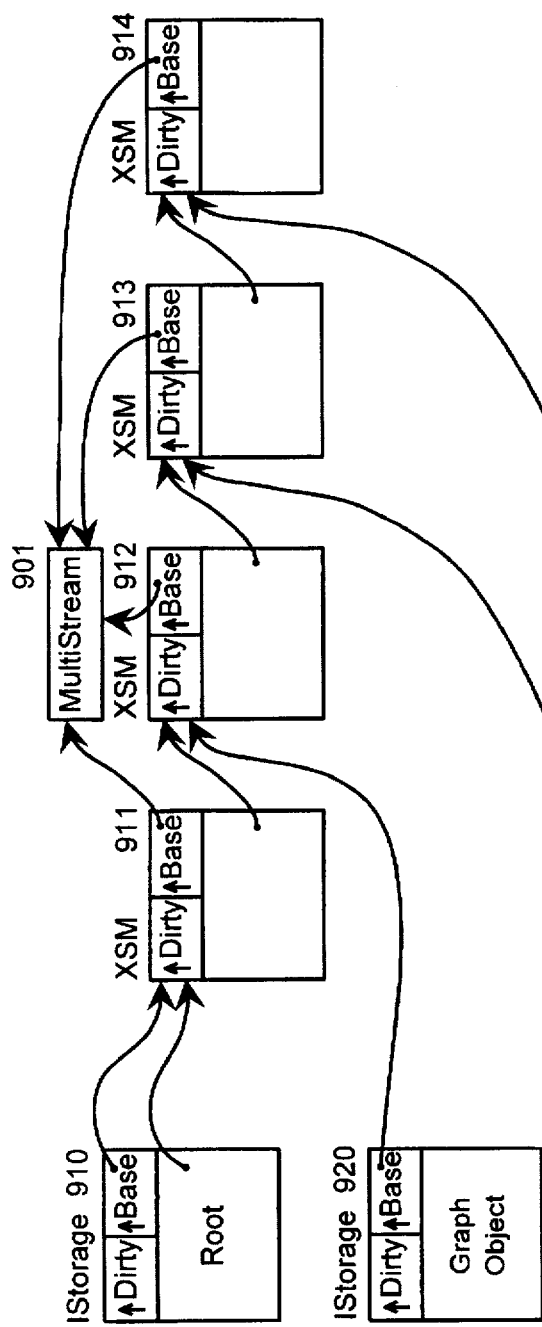
FIG. 9 is a block diagram illustrating the transaction levels in a preferred embodiment.

FIG. 9 is a block diagram illustrating the transaction levels in a preferred embodiment. FIG. 8 is a sample object hierarchy diagram. FIGS. 7 and 9 illustrate the transaction levels when a storage is opened in transacted and direct modes, respectively. When the graph object storage is opened in direct mode, the IStorage instance 920 requests the root IStorage instance 910 for a pointer to its base. In response, the root IStorage instance 910 instantiates XSM instance 912 and sets its base to point to persistent storage.

The root IStorage instance 910 returns a pointer to the graph object IStorage instance 920, which stores the pointer as its base. Similarly, when the XY data and title data streams are instantiated, they are returned pointers to XSM instances of the root IStorage 910. Since the graph object storage is not transacted, it has no corresponding transaction level and all changes made to the graph object are sent to the root storage transaction set members.

Figure 10:
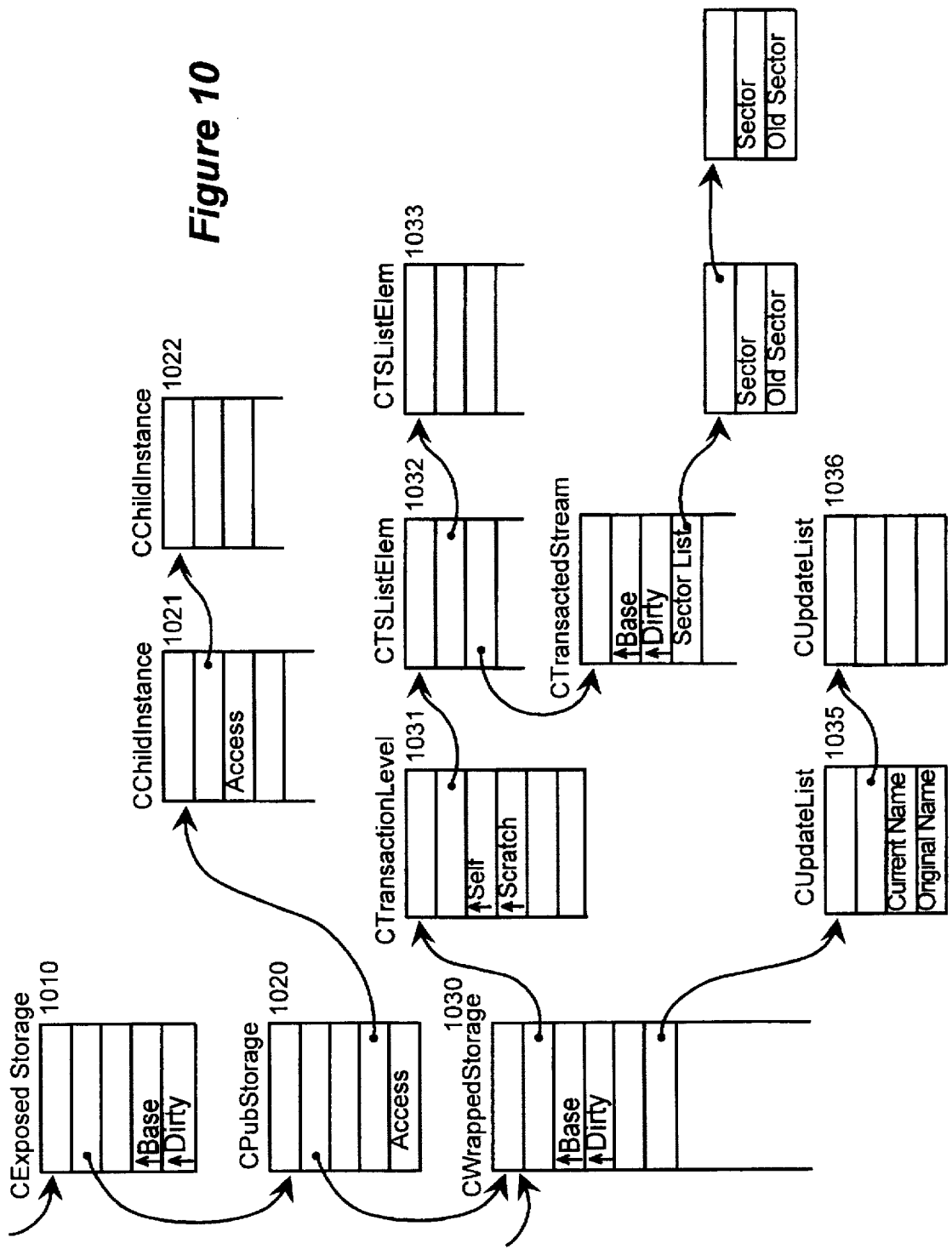
FIG. 10 is a block diagram showing the various layers of an IStorage instance.

FIG. 10 is a block diagram showing the various layers of an IStorage instance. Each block represents a member C++ class with member methods. An IStorage instance as discussed above comprises an exposed, public, and a wrapped layer. These layers are represented by class instances CExposedStorage 1010, CPubStorage 1020, and CWrappedStorage 1030. The exposed storage layer contains a pointer to the public storage layer and base and dirty pointers, which it would use if the instance is not in transacted mode. The public layer contains a pointer to the wrapped layer, a pointer to the parent public layer, a pointer to a link list containing the access modes of its children, and the access modes corresponding to the IStorage instance. The wrapped layer contains a pointer to a transaction level instance, a pointer to an update list, and dirty and base pointers. The transaction level instance contains a pointer to a linked list of transaction set members, a pointer indicating which transaction set member corresponds to this IStorage instance, and information indicating where to store the transacted data. The update list contains the transactions on the names of the elements of the IStorage instance. The transaction set member points to a corresponding transacted stream data structure, which stores the changes to a stream.

Figure 11:
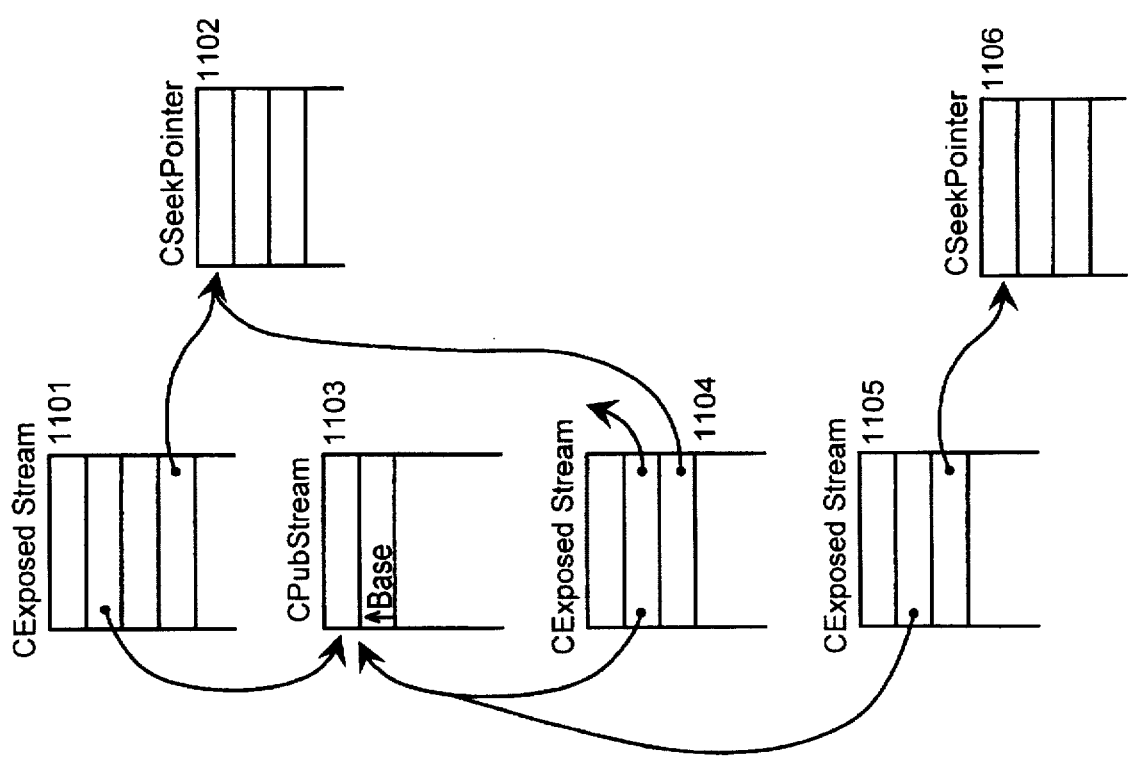
FIG. 11 is a block diagram of C++ classes which support an IStream instance.

FIG. 11 is a block diagram of C++ classes which support an IStream instance. In a preferred implementation, IStream instances are not transacted. Consequently, IStream instance has only an exposed layer 1101 and a public layer 1103. The exposed layer 1101 points to the seek pointer 1102. If an IStream instance is cloned, a new exposed layer 1105 is created along with a new seek pointer 1106. The new exposed layer 1105 points to the public layer 1103 of the cloned instance and points to the new seek pointer 1106.

DocFile Implementation

Figure 12:
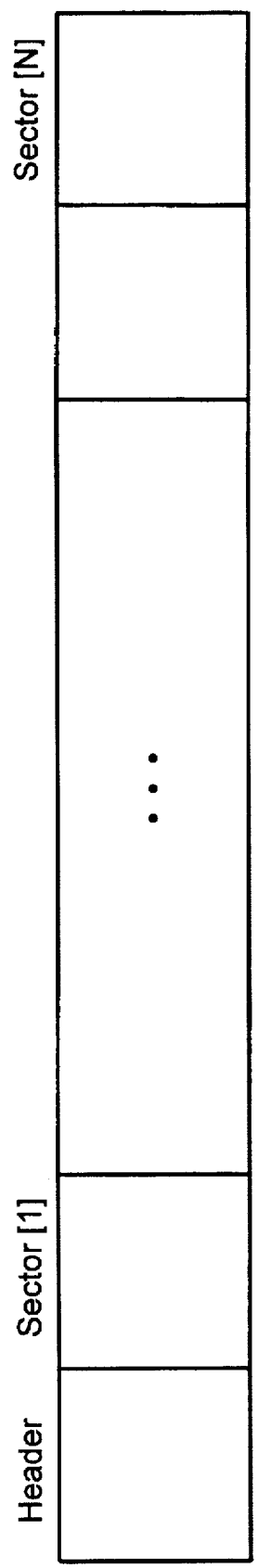
FIG. 12 is a diagram of the layout of the sectors in one document file.

The Docfile Implementation maps the object hierarchy of the IStorage and IStream interfaces into the persistent storage using the ILockBytes interface. The ILockBytes interface as described below presents a view of persistent storage as an array of bytes. The DocFile Implementation logically divides the array into a header and the plurality of fixed length sectors. FIG. 12 is a diagram of the layout of the sectors in one document file. The format of this implementation is referred to as the multistream file format (MSFF). In a preferred embodiment, the header is 512 bytes. The sector size is stored in the header and is typically a multiple of 512 bytes. The sectors are typed according to the type of information each contains. The types are FAT, directory, MiniFAT, DIF, and data. The MSFF uses a file allocation table (FAT) and a doubly indirect file allocation table (DIF) to link sectors of the same type to form a logically contiguous stream.

Figure 13:
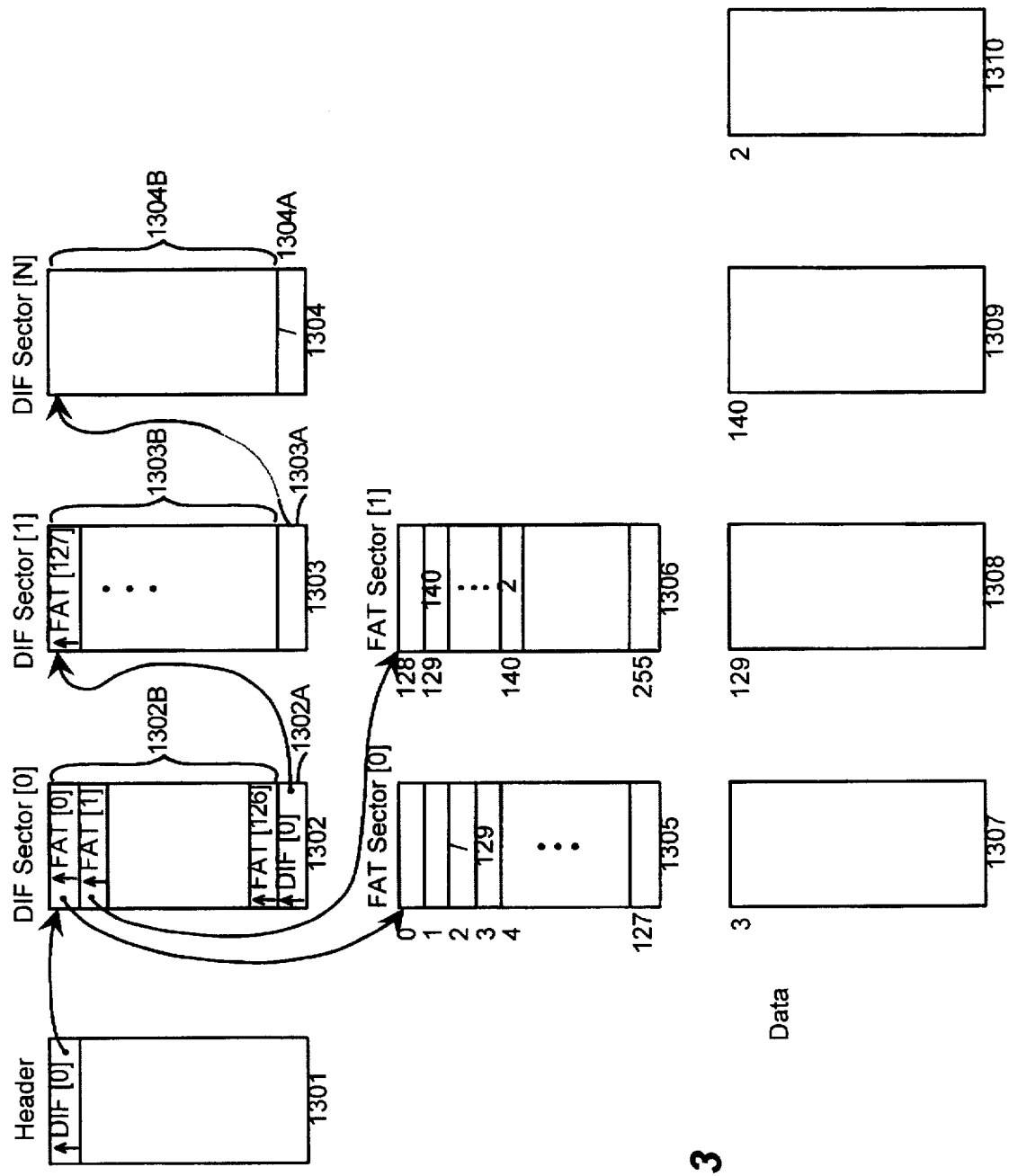
FIG. 13 is a diagram showing the allocation structures of the MSFF.

FIG. 13 is a diagram showing the allocation structures of the MSFF. This example assumes the sector size is 512 bytes and the pointers to sectors are 4 bytes. In this example, the header, 1301, points to a link list of DIF sectors 1302–1304. The DIF sectors form a linked list using links 1302A, 1303A, and 1304A. Each DIF sector contains a table 1302B, 1303B, and 1304B of pointers to FAT sectors. The number of pointers in the table depends on the sector size. As shown in FIG. 13, each DIF sector table contains 127 pointers to FAT sectors.

The FAT sectors contain a logically contiguous array of FAT entries. There is one FAT entry for each sector in the persistent storage array. Each FAT sector contains 128 FAT entries. The FAT entries contain pointers that link together the sectors that form MSFF streams. An MSFF stream is a logically contiguous set of sectors of the same type. For each sector in a stream, the FAT entry corresponding to that sector contains a pointer to the next logically contiguous sector in the stream. For example, the data stream 1307–1310 contains four data sectors. Sector 1307 is stored in sector 3; sector 1308 is stored in sector 129; sector 1309 is stored in sector 140; and sector 1310 is stored in sector 2. The FAT entries link this stream together in the following way: Sinde sector 3 contains the first sector in the stream, FAT entry 3 (FAT[3]) contains 129, which is the sector that contains the second sector in the data stream. FAT entry 129 (FAT[129]) contains 140, which is the sector that contains the third sector in the data stream. FAT entry 140 (FAT[140]) contains 2, which is the sector that contains the last sector in the data stream. Since sector 2 contains the last sector in the data stream, FAT entry 2 (FAT[2]) contains an end of the data stream indicator. Once the start sector for a stream is given, the other sectors in the stream can be located by traversing the linked list in the FAT.

The entries of the DIF sectors indicate where each FAT sector is actually stored. The first DIF sector contains the sector locations of the first 127 FAT sectors; the second DIF sector contains the sector location of the second 127 FAT sectors; etc. Thus, given the location of the first DIF sector, which is stored in the header, all FAT sectors can be located.

Figure 14:
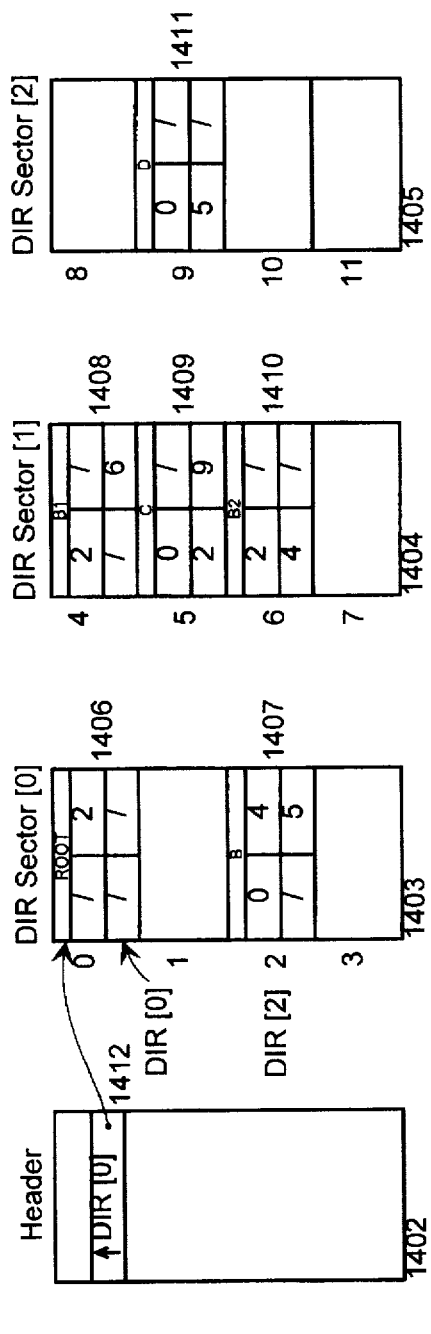
FIG. 14 is a block diagram showing the layout of a sample directory stream.
Figure 15:
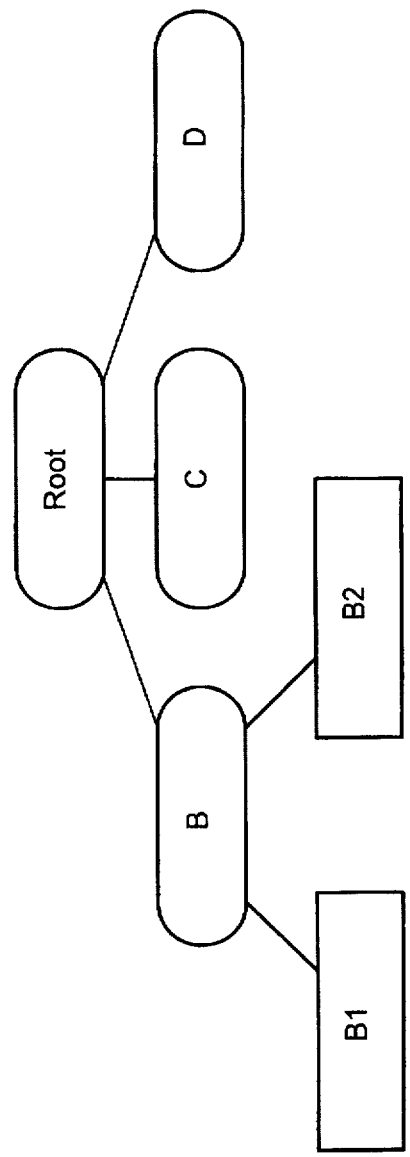
FIG. 15 is the sample object hierarchy illustrated by FIG. 14.

The MSFF header contains a pointer to a directory stream. The directory stream contains the directory structure for the MSFF. FIG. 14 is a block diagram showing the layout of a sample directory stream. FIG. 15 is the sample object hierarchy illustrated by FIG. 14. A directory corresponds to an IStorage instance, and a data stream corresponds to an IStream instance. As shown in FIG. 15, the directory contains a root directory and sub-directories B, C, and D, and data streams B1 and B2 within sub-directory B. The MSFF preferably stores four directory entries within each directory sector. Template 1401 shows the structure of each directory entry. Each entry contains name and status information. If the entry corresponds to a data stream, it contains the start sector of that data stream. Each directory entry also contains the directory entry index of its parent, its left-most child, its previous sibling, and its next sibling. The header A02 contains the sector number of the first directory sector 1403. The directory sectors are linked by the FAT. In this example, the directory entries of the hierarchy are stored in directory sectors 1405, 1404, and 1405. The directory entries 1406–1411 each correspond to a storage stream in the hierarchy. Directory entry 0 (DIR[0]) 1406 corresponds to the root storage and indicates that its left-most child is stored in directory entry 2 (DIR[2]). Directory entry 2 (DIR[2]) 1407 contains the entry for sub-directory B. Directory entry 2 indicates that its parent is the root node (DIR[0]), it has a child stored in directory entry 4 (Dir[4]), it has no previous sibling, and its next sibling is stored in directory entry 5 (DIR[5]). Directory entry 4 (DIR[4]) 1408 corresponds to data stream B1, and contains the starting sector number (not shown) of data stream B1. Directory entry 4 indicates that its parent is stored in directory entry 2 (DIR[2]), it has no children, it has no previous sibling, and its next sibling is stored in directory entry 6 (DIR[6]). Directory entry 6 (Dir[6]) 1410 corresponds to data stream B2, and contains the starting sector number for data stream B2. Directory entry 6 indicates that its parent is stored in directory entry 2, it has no children, its previous sibling is stored in directory entry 4, and it has no next sibling. Directory entry 5 (DIR[5]) 1409 contains the entry for sub-directory C. Directory entry 5 indicates that its parent is stored in directory entry 0, it has no children, its previous sibling is stored in directory entry 2, and its next sibling is stored in directory entry 9. Directory entry 9 (DIR[9]) 1411 contains the entry for sub-directory D. Directory entry 9 indicates that its parent is stored in directory entry 0, it has no children, its previous sibling is stored in directory entry 5, and it has no next sibling.

The MSFF is designed to facilitate the updating of the persistent storage in a robust manner. This robust manner helps ensure that the persistent storage will not be left in an inconsistent state. When the persistent storage is updated in a robust manner, existing data is not overwritten, rather updated sectors of information are written to free blocks. The process of writing an updated sector to a free block is referred to as "shadowing." Once all the sectors that need to be modified are shadowed, then the header is overwritten to link the new data into the directory hierarchy. The updating of the persistent storage in a robust manner tends to minimize the risk that the file will be left in an inconsistent state due to a system failure.

Figure 16:
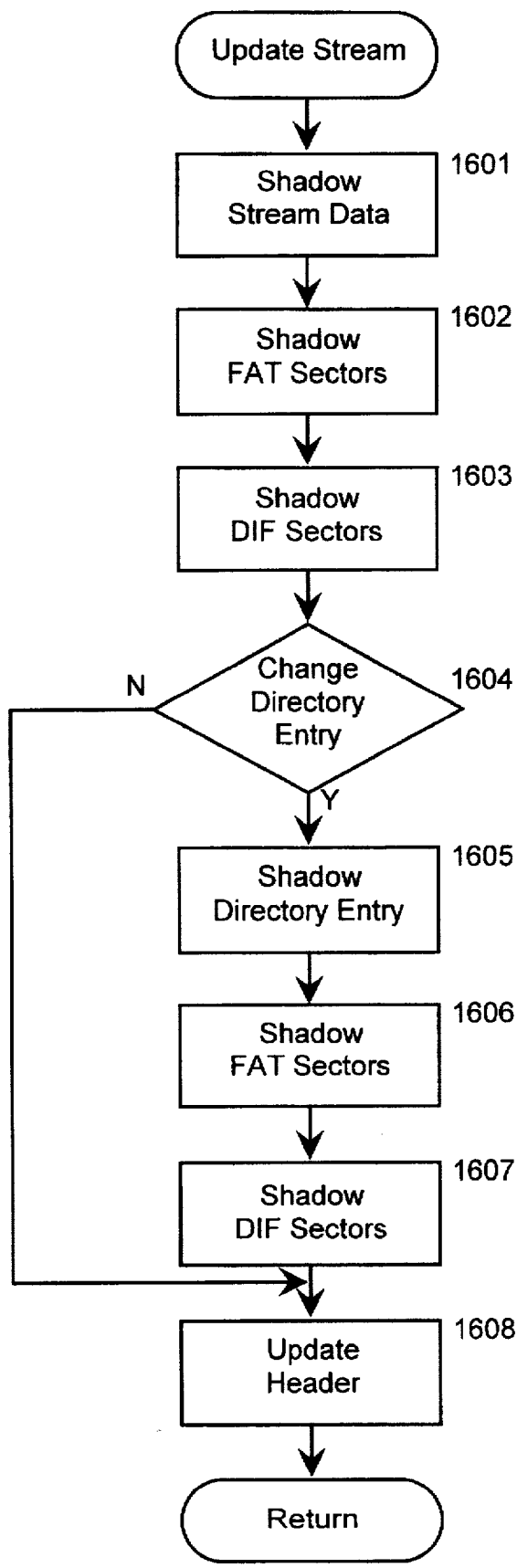
FIG. 16 is a flow diagram showing a procedure to update a data stream in a robust manner.

FIG. 16 is a flow diagram showing a procedure to update a data stream in a robust manner. In step 1601, the routine writes the new data to free sectors within the file. The file is extended if there are no free sectors. In step 1602, the routine reads the FAT sectors that contain the FAT entries corresponding to the sectors containing the old and new data, modifies the FAT entries to indicate which sectors are now part of the data stream, and writes the FAT sectors to a free block. In step 1603, the routine reads each DIF sector that corresponds to a FAT sector that has been shadowed, updates the DIF sector to point to the new sector of the FAT sector, and writes the DIF sector to a free block. The routine also shadows every DIF sector that is logically prior to the one that was just shadowed. This shadowing of the DIF sectors is used to update the pointers in the linked list of DIF sectors. In step 1604, the routine determines whether the updates to the data stream result in information to the directory being changed (which it always will if the directory entry contains time of last modification). If a change is needed, the routine continues at step 1605 or else the routine continues at step 1608. In steps 1605 through steps 1607, the routine shadows the directory sector containing the directory entry corresponding to the updated data stream, shadows the FAT sectors that correspond to the old and new directory sectors, and shadows the appropriated DIF sectors. Finally, in step 1608, the routine updates the header data to point to the new shadowed sectors by modifying the pointer to the DIF.

Figure 17:
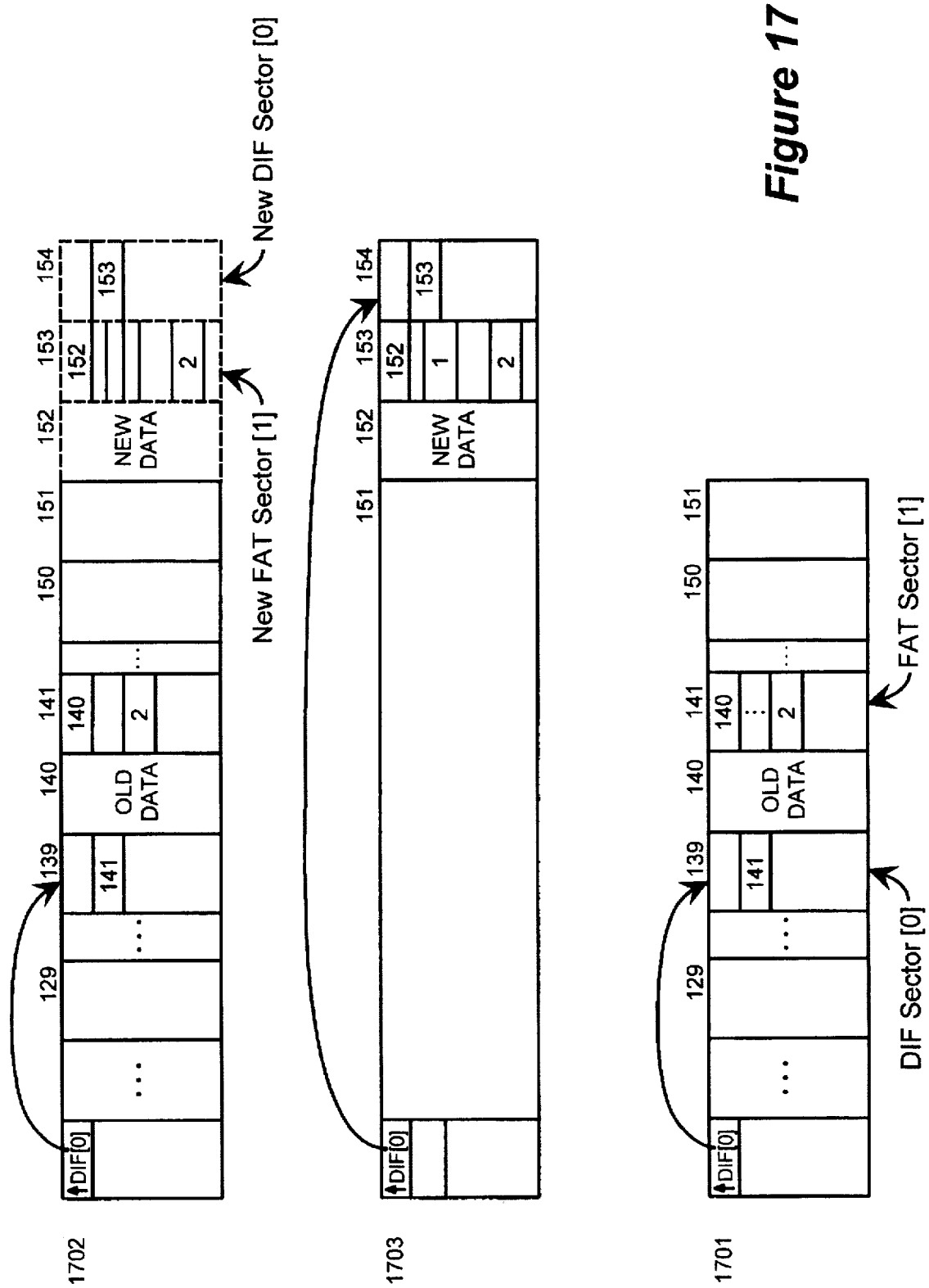
FIG. 17 is a diagram illustrating the shadowing methods of the present invention.

FIG. 17 is a diagram illustrating the shadowing methods of the present invention. Structure 1701 represents to storage array before being updated. The data shown in this file corresponds to the data stream example of FIG. 13. In this example, the data in sector 140 is updated. DIF sector 0 ((DIF[0]) is stored in sector 139. DIF entry 1 (DIF[1]) indicates that FAT sector 1 is stored in sector 141. FAT sector 1 contains FAT entry 129 (FAT[129]), which indicates that sector 140 contains the next sector in the data stream, and contains FAT entry 140 (FAT[140]), which indicates that sector 2 contains the next sector in the data stream. File 1702 illustrates shadowing when the data in sector 140 is updated. The shadow sectors are indicated by dash lines. The new data is written to sector 152. The FAT sector 1 from sector 141 is retrieved and FAT entry 129 is modified to point to sector 152, FAT entry 152 is modified to point to sector is 2, and FAT entry 140 is modified to indicate that sector 140 is no longer in the data stream and is free. The modified FAT sector 1 is then written to sector 153. DIF sector [0] is retrieved and modified to indicate that FAT sector [1] is now stored in sector 152, and written to sector 154. At this point, the persistent storage is in a consistent state because the old data is left intact and the new data has just been added to the end of the file (or stored within free sectors). Finally, a new header sector as shown in block 1703 indicating that the DIF sector 0 is now in sector 154.

Figure 18:
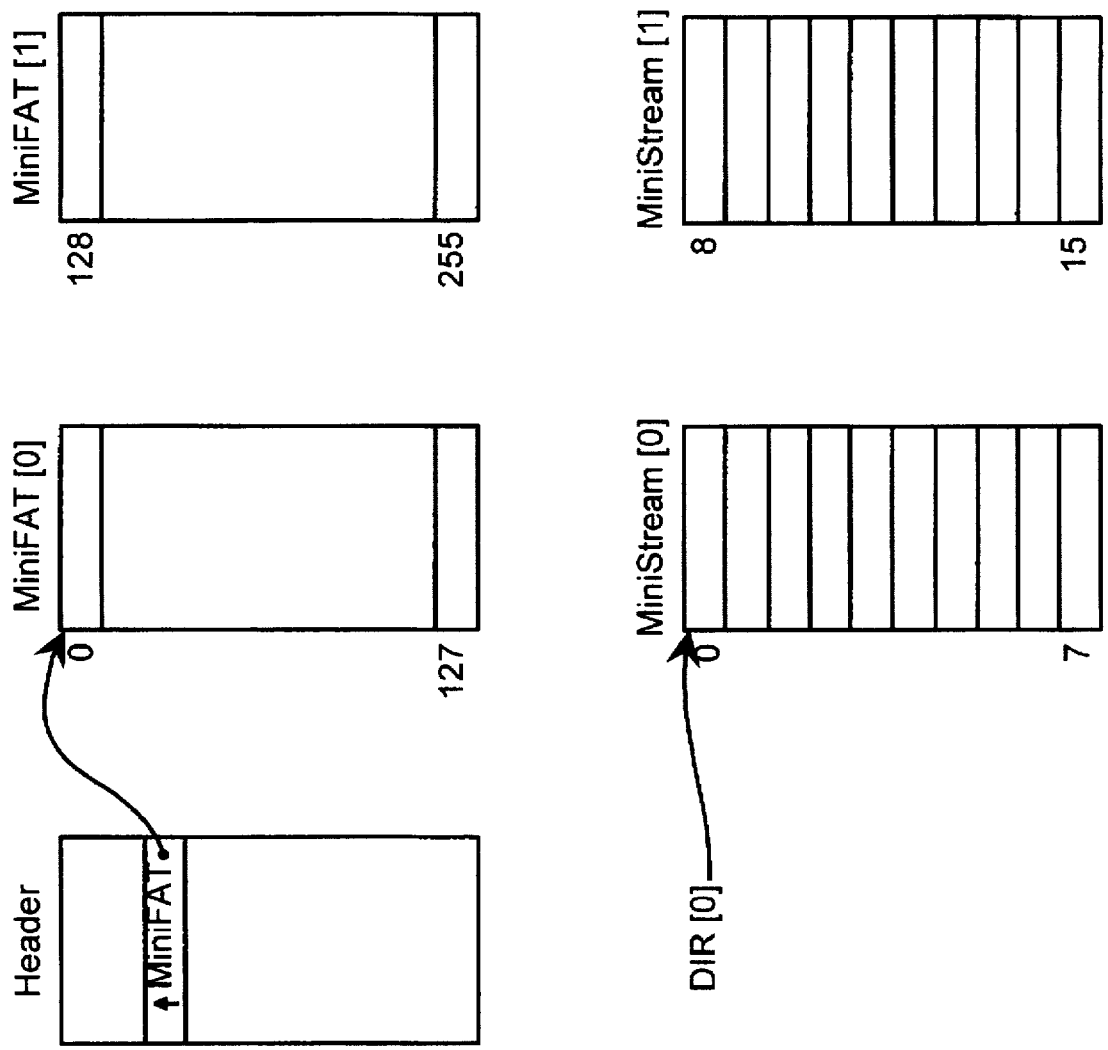
FIG. 18 is a block diagram showing the layout of the MiniStream and MiniFAT.

In a preferred embodiment, the sector size is 512 bytes. However, in many situations there may be a need to store data streams that are significantly shorter than 512 bytes. Since a sector can contain data for only one data stream, a significant portion of a persistent storage may contain "unused" space. To reduce the amount of unused space within a persistent storage, the present invention stores "small" data streams in special sectors referred to as MiniStream sectors, a stream is designated whose allocation is tracked by data stored in MiniFAT sectors. In the MiniStream, each sector is logically divided into 64-byte minisectors. The MiniFAT, which is analogous to the FAT, contains the linking information for the MiniStream. In a preferred embodiment, the header points to the first sector in the MiniFAT, and the root directory entry (Dir[0]) points to the first sector in the MiniStream. The FAT is used to link the sectors in the MiniFAT and MiniStream. In a preferred embodiment, when a data stream is smaller than 256 bytes, it is stored in the MiniStream. When data is written to the MiniStream, the directory entry in the directory stream for the data stream points to the first minisector for the data stream. Subsequent, minisectors in the data stream are linked through the MiniFAT. FIG. 18 is a block diagram showing the layout of the MiniStream and MiniFAT.

In an alternate embodiment, very small data streams can be stored in the directory entry itself. If a very small data stream were to grow too large for the directory entry, the data stream would then be stored in the MiniStream. If a data stream stored in the MiniStream grew to be larger than a specified size, it would then be stored in a data stream. To optimize performance, the header information can contain the locations of the first few FAT sectors to improve performance when accessing a small persistent storage.

Ilockbytes Implementation

The ILockBytes Implementation 403 implements the ILockBytes interface. The ILockBytes interface as described below provides a model of the underlying storage media. In a preferred embodiment, the ILockBytes Implementation 403 operates on the underlying file system. However, other implementation could be developed to operate in other media. In the above description of the IStorage/IStream Implementation 403, multiple instances of the ILockBytes interface are used. One instance points to the scratch file and another is used to point to the actual document file. Also, an additional parameter can be added to the StgCreateDocFile and StgOpenDocFile function to allow the application program to specify an ILockBytes instance.

Table 5 defines the ILockBytes interface. The parameters of the methods of the ILockBytes interface are described in Table 6. The behavior of each method is specified in the following.

TABLE 5

| Class | ILockBytes | |
|---|---|---|
| { | | |
| virtual | SCODE | ReadAt(libOffset, pv, cb, pcbRead)=0; |
| virtual | SCODE | WriteAt(libOffset, pv, cb, pcbWritten) =0; |
| virtual | SCODE | Flush() =0; |
| virtual | SCODE | SetSize(cb)=0; |
| virtual | SCODE | LockRegion(libOffset, cb, dwLockType) =0; |
| virtual | SCODE | UnlockRegion(libOffset, cb, dwLockType)=0; |
| virtual | SCODE | Stat(pstatstg)=0. |
| } | | |

TABLE 6

| Argument | Description |
|---|---|
| libOffset | offset into the storage array at which to begin a read or write |
| pv | pointer to a buffer |
| cb | number of bytes to attempt to read from the storage array |
| pcbRead | number of byte actually read |

ILockBytes::ReadAt

The ReadAt method reads the designated number of bytes into the designated buffer from the storage array of the specified ILockBytes instance starting at the designated offset. The number of bytes actually read is returned. The number of bytes actually read may be fewer than requested if the end of the storage array is encountered during the read. If the read overlaps a read locked region of the storage array, an error is returned.

ILockBytes::WriteAt

The WriteAt method writes the designated number of bytes from the designated buffer to storage array of the ILockBytes instance starting at the designated offset. If the offset is past the current end of the storage array, then the storage array is increased in size with uninitialized bytes. The number of bytes actually written is returned in pcbWritten. If the write overlaps a locked region, then an error is returned.

ILockBytes::Flush

The Flush method writes any internal buffers maintained by the implementation of the specified ILockBytes instance to the storage array.

ILockBytes::SetSize

The SetSize method changes the size of the storage array of the specified ILockBytes instance to the designated number of bytes. The storage array is either increased in size or decreased in size. If the storage array is increased in size, the contents of the new bytes are undefined.

ILockBytes::LockRegion

The LockRegion method attempts to lock a region of the storage array of the specified ILockBytes instance. The region begins with the designated offset and extends for the designated number of bytes towards the end of the storage array. It is legal to indicate a range of bytes that extends past the current end of the storage array. The locking behavior of this method is analogous to that of the IStream::LockRegion method.

ILockBytes::UnlockRegion

The UnlockRegion method unlocks a previously locked region of the storage array of the specified ILockBytes instance.

ILockBytes::Stat

The Star method returns information about the storage array of the specified ILockBytes instance.

Although the present invention has been described in terms of preferred embodiments, it is not intended that the invention be limited to these embodiments. Modifications within the spirit of the invention will be apparent to those skilled in the art. The scope of the present invention is defined by the claims that follow.

We claim:

1. A method in a computer system for storing data in a data storage area, the computer system having an application program that invokes a first application interface layer for accessing the data, the method comprising the steps of:

under control of the application interface layer;

receiving from the application program a reference to a second intermediate interface, the intermediate interface having a plurality of functions for accessing the data storage area, one of the functions for resizing the data storage area;

receiving from the application program a request to access the data storage area;

in response to receiving the request, invoking one or more functions of the intermediate interface received from the application program to effect: the accessing and resizing of the data storage area; and wherein the application interface layer can receive references to different implementations of the intermediate interface from different application programs.

2. The method of claim 1 wherein the intermediate interface received from the application program includes a function for accessing the data storage area as an array of bytes.

3. The method of claim 2 wherein the intermediate interface received from the application program includes a function for locking a range of bytes of the array to prevent conflicting access to the range of bytes.

4. The method of claim 1 wherein the computer system has a file system, wherein the data storage area is a file, and the intermediate interface received from the application program includes functions that invoke the file system to effect the accessing of the data storage area.

5. An object storage computer system for storing objects into a data storage area of the computer system comprising:

a first application interface layer invocable by an application program, application interface layer providing a hierarchical organization for the storage of the objects, each object optionally having a subobject and optionally having object data, the application interface layer having a storage interface for enumerating; the subobjects of an object and for providing a stream interface for object data, the stream interface for accessing the object data;

a second intermediate layer invocable by the application interface layer, the intermediate layer for providing a linear organization for the storage of data, the intermediate layer having an access interface for accessing the data of the storage;

a third bottom layer invocable by the intermediate layer fear directly accessing the data storage area such that when an application program invokes the application interface layer, the application interface layer invokes the intermediate layer; and the intermediate layer invokes the bottom layer to directly access the data storage area and such that when an application program invokes the application interface layer, the application program specifies an implementation of the intermediate layer that is to be invoked by the application interface layer; and wherein different application programs can specify different implementations of the intermediate layer.

6. The system of claim 5 wherein the intermediate layer includes a method for dynamically changing the size of an array representing the linear organization of the storage.

7. The system of claim 6 wherein the intermediate layer includes a method for locking a range of bytes in the array to prevent conflicting access to the locked range.

8. The system of claim 5 or 6 wherein the application interface layer includes methods for transactioning modifications to the data.

9. The system of claim 5 or 6 wherein the bottom layer is a file system.

10. The system of claim 9 wherein the file system uses a file allocation table.

11. The system of claim 5 or 6 wherein the application interface layer includes methods for storing data in a stream.

12. The system of claim 5 or 6 wherein the application interface layer provides methods for storing objects in a hierarchical manner.

13. A method in a computer system for accessing object data in a data storage area, the computer system having an application program, comprising:

under control of the application program, invoking a first application interface layer to access to object data, the application program providing to the application interface layer an implementation of a second intermediate layer, the application interface layer providing a predefined organization for the storage of the object data, the intermediate layer for providing a linear organization for the storage of object data;

under control of the application interface layer, invoking the intermediate layer to access the linear organization for the storage of object data;

under control of the intermediate layer invoking a third bottom layer for directly accessing the data storage area in which object data is stored; and wherein different application program can specify different implementations of the intermediate layer to customize the accessing of the object data.

14. The method of claim 13 wherein the intermediate layer includes a method for dynamically changing the size of the linear organization.

15. The method of claim 13 wherein the intermediate layer includes a method for locking a range of bytes in the linear organization to prevent conflicting access to the locked range.

16. The method of claim 13 wherein the application interface layer includes methods for transactioning modifications to the data.

17. The method of claim 13 wherein the bottom layer is a file system.

18. The method of claim 17 wherein the file system uses a file allocation table.

19. The method of claim 13 wherein the application interface layer includes methods for storing data in a stream.

20. The method of claim 13 wherein the application interface layer provides methods for storing objects in a hierarchical manner.

21. A computer-readable medium containing instructions for causing a computer system to access object data in a data storage area by:

under control of the application program, invoking a first application interface layer to access object data, the application program providing to the application interface layer an implementation of a second intermediate layer, the application interface layer providing a predefined organization for the storage of the object data, the intermediate interface layer for providing a linear organization for the storage of object data and for providing for the resizing of the linear organization;

under control of the application interface layer, invoking the intermediate layer to access the linear organization;

under control of the intermediate interface layer, invoking a third bottom layer for directly accessing the data storage area in which object data is stored; and wherein different application programs can specify implementations of the intermediate layer to customize the object data.

22. The computer-readable medium of claim 21 wherein the intermediate layer includes a method for dynamically changing the size of the linear organization.

23. The computer-readable medium of claim 21 wherein the intermediate layer includes a method for locking a range of bytes to prevent conflicting access to the locked range.

24. The computer-readable medium of claim 21 wherein the application interface layer includes methods for transactioning modifications to the data.

25. The computer-readable medium of claim 21 wherein the bottom layer is a file system.

26. The computer-readable medium of claim 25 wherein the file system uses a file allocation table.

27. The computer-readable medium of claim 21 wherein the application interface layer includes methods for storing data in a stream.

28. The computer-readable medium of claim 21 wherein the application interface layer provides methods for storing objects in a hierarchical manner.

* * * * *

UNITED STATES PATENT AND TRADEMARK OFFICE
CERTIFICATE OF CORRECTION

PATENT NO. : 5,715,441

DATED : February 3, 1998

INVENTOR(S) : Atkinson et al.

It is certified that error appears in the above-identified patent and that said Letters Patent is hereby corrected as shown below:

Column 14, line 51, please change "710" (second occurrence) to --713--.

Column 16, line 46, please change "A02" to --1402--.

Column 16, line 50, please change "1405" (first occurrence) to --1403--.

Column 18, line 4, please change "152" to --153--.

Column 18, line 61, please change "function" to --functions--.

In the Claims:

Claim 1, column 20, line 12, please change ";" to --,--.

Claim 5, column 20, line 58, please change "fear" to --for--.

Claim 13, column 21, line 25, please delete "to" (second occurrence).

Claim 13, column 21, line 39, please change "program" to --programs--.

Signed and Sealed this

Twentieth Day of February, 2001

*Attest:*

NICHOLAS P. GODICI

*Attesting Officer*  *Acting Director of the United States Patent and Trademark Office*